US009292885B2

(12) United States Patent
Astore

(10) Patent No.: US 9,292,885 B2
(45) Date of Patent: Mar. 22, 2016

(54) METHOD AND SYSTEM FOR PROVIDING SOCIAL SEARCH AND CONNECTION SERVICES WITH A SOCIAL MEDIA ECOSYSTEM

(71) Applicant: Jon Anthony Astore, Bradenton, FL (US)

(72) Inventor: Jon Anthony Astore, Bradenton, FL (US)

(73) Assignee: Unittus, Inc., Bradenton, FL (US)

( * ) Notice: Subject to any disclaimer, the term of this patent is extended or adjusted under 35 U.S.C. 154(b) by 151 days.

(21) Appl. No.: 14/011,164

(22) Filed: Aug. 27, 2013

(65) Prior Publication Data
US 2014/0006377 A1 Jan. 2, 2014

(51) Int. Cl.
*G06F 17/30* (2006.01)
*G06Q 50/00* (2012.01)
*G06Q 30/02* (2012.01)

(52) U.S. Cl.
CPC .......... *G06Q 50/01* (2013.01); *G06F 17/30867* (2013.01); *G06Q 30/0239* (2013.01); *G06Q 30/0269* (2013.01)

(58) Field of Classification Search
CPC .......... G06Q 30/0241; G06Q 30/0251; G06Q 30/0253; G06Q 30/0256; G06Q 30/0273; G06F 17/30867
USPC .............. 707/736, 741; 705/319, 14.4, 14.49, 705/14.51, 14.66, 14.67
See application file for complete search history.

(56) References Cited

U.S. PATENT DOCUMENTS

| | | |
|---|---|---|
| 5,794,207 A | 8/1998 | Walker et al. |
| 6,928,416 B1 | 8/2005 | Bertash |
| 7,117,168 B2 | 10/2006 | Eaton |
| 7,313,539 B1 | 12/2007 | Pappas et al. |
| 7,783,537 B1 | 8/2010 | Van Luchene et al. |
| 7,865,424 B2 | 1/2011 | Pappas et al. |
| 7,962,375 B2 | 6/2011 | Pappas et al. |
| 7,996,292 B2 | 8/2011 | Pappas et al. |
| 8,032,447 B2 | 10/2011 | Pappas et al. |
| 8,224,714 B2 | 7/2012 | Yost |
| 8,229,841 B2 | 7/2012 | Pappas et al. |
| 8,301,550 B2 | 10/2012 | Pappas et al. |
| 8,463,765 B2 | 6/2013 | Lesavich |

(Continued)

FOREIGN PATENT DOCUMENTS

| | | | |
|---|---|---|---|
| WO | WO2012011981 A1 | 1/2012 | |
| WO | WO 2012011981 A1 * | 1/2012 | ............ G06Q 30/02 |

*Primary Examiner* — Christyann Pulliam
*Assistant Examiner* — Jedidiah Ferrer
(74) *Attorney, Agent, or Firm* — Lesavich High-Tech Law Group, S.C.; Stephen Lesavich

(57) ABSTRACT

A method and system for social media ecosystem searching. A desired person can be searched for from public search engines and social media sites directly by name and/or by unique search keywords and search categories created and publically published by the desired person, a social media index of the desired person or a social commerce connection associated with the desired person. The search results are publically viewable. However, communication with the desired person located within the social media ecosystem is via a private system in which a searcher must provide login information to privately communicate with the desired person. The private system helps ensure that social media index values and social commerce connections are properly established, recorded and updated for the desired person and provides a layer of security and privacy. The social media searching ecosystem is provided on a cloud communications network for mobile and non-mobile devices.

19 Claims, 15 Drawing Sheets

(56) References Cited

U.S. PATENT DOCUMENTS

| | | |
|---|---|---|
| 8,533,015 B2 | 9/2013 | Meegan |
| 8,543,450 B2 | 9/2013 | Pappas et al. |
| 8,577,741 B1 | 11/2013 | Lyren et al. |
| 8,620,771 B2 | 12/2013 | Pappas et al. |
| 8,650,114 B2 | 2/2014 | Pappas et al. |
| 8,775,247 B2 | 7/2014 | Kendall et al. |
| 8,781,866 B2 | 7/2014 | Meegan et al. |
| 8,930,260 B2 | 1/2015 | Pappas et al. |
| 9,026,471 B2 | 5/2015 | Pappas et al. |
| 9,026,472 B2 | 5/2015 | Pappas et al. |
| 9,037,564 B2 | 5/2015 | Lesavich et al. |
| 9,047,634 B2 | 6/2015 | Pappas et al. |
| 9,064,258 B2 | 6/2015 | Pappas et al. |
| 9,070,150 B2 | 6/2015 | Pappas et al. |
| 9,137,250 B2 | 9/2015 | Lesavich et al. |
| 2004/0128224 A1 | 7/2004 | Dabney et al. |
| 2005/0119947 A1 | 6/2005 | Lin |
| 2005/0131716 A1* | 6/2005 | Hanan et al. ............... 705/1 |
| 2005/0135345 A1 | 6/2005 | Young et al. |
| 2006/0190343 A1 | 8/2006 | Cooper |
| 2007/0112729 A1* | 5/2007 | Wiseman et al. ............... 707/3 |
| 2008/0021783 A1* | 1/2008 | Varghese .................... 705/14 |
| 2008/0021810 A1 | 1/2008 | Pappas |
| 2008/0065514 A1 | 3/2008 | Eaton |
| 2008/0215457 A1 | 9/2008 | Pappas |
| 2008/0215495 A1 | 9/2008 | Pappas |
| 2009/0119256 A1 | 5/2009 | Waters et al. |
| 2009/0132387 A1 | 5/2009 | Majdoub |
| 2009/0234755 A1 | 9/2009 | Sidoruk |
| 2009/0326967 A1* | 12/2009 | Kalaboukis ................. 705/1 |
| 2010/0076775 A1* | 3/2010 | Tesler et al. ................. 705/1 |
| 2010/0145815 A1 | 6/2010 | Weng |
| 2010/0161662 A1* | 6/2010 | Jonas et al. ............... 707/780 |
| 2011/0029408 A1 | 2/2011 | Shusterman et al. |
| 2011/0047229 A1* | 2/2011 | Sinha et al. ............... 709/206 |
| 2011/0106927 A1 | 5/2011 | Carter et al. |
| 2011/0131109 A1 | 6/2011 | Pappas et al. |
| 2011/0167059 A1* | 7/2011 | Fallah ........................ 707/723 |
| 2011/0191318 A1* | 8/2011 | Gilbey et al. ............... 707/706 |
| 2011/0208710 A1 | 8/2011 | Lesavich |
| 2011/0288937 A1* | 11/2011 | Manoogian et al. ........ 705/14.66 |
| 2011/0301986 A1 | 12/2011 | Pappas et al. |
| 2011/0307279 A1 | 12/2011 | Pappas et al. |
| 2012/0042162 A1* | 2/2012 | Anglin et al. ............... 713/165 |
| 2012/0078698 A1 | 3/2012 | Pappas et al. |
| 2012/0143862 A1* | 6/2012 | Jones ............... G06F 17/30699 |
| | | 707/732 |
| 2012/0278622 A1* | 11/2012 | Lesavich et al. ............ 713/168 |
| 2013/0013384 A1 | 1/2013 | Pappas et al. |
| 2013/0060591 A1 | 3/2013 | Meegan |
| 2013/0073430 A1 | 3/2013 | Gallen et al. |
| 2013/0096965 A1 | 4/2013 | Pappas et al. |
| 2013/0110599 A1 | 5/2013 | Gonzales |
| 2013/0166360 A1 | 6/2013 | Kshetramade et al. |
| 2013/0191124 A1 | 7/2013 | Pappas et al. |
| 2013/0191244 A1 | 7/2013 | Pappas et al. |
| 2013/0191269 A1 | 7/2013 | Pappas et al. |
| 2013/0198009 A1 | 8/2013 | Pappas et al. |
| 2013/0198036 A1 | 8/2013 | Pappas et al. |
| 2013/0204658 A1 | 8/2013 | Yogev et al. |
| 2013/0211970 A1 | 8/2013 | Glass et al. |
| 2013/0226726 A1 | 8/2013 | Walker et al. |
| 2013/0246137 A1 | 9/2013 | McGuire |
| 2013/0254003 A1 | 9/2013 | Pappas et al. |
| 2013/0297403 A1 | 11/2013 | Manning |
| 2013/0311339 A1* | 11/2013 | Jeremias ............ G06Q 30/0601 |
| | | 705/27.1 |
| 2014/0006125 A1 | 1/2014 | Meegan |
| 2014/0006377 A1 | 1/2014 | Astore |
| 2014/0052513 A1 | 2/2014 | Ryan et al. |
| 2014/0059033 A1 | 2/2014 | Shaw et al. |
| 2014/0189792 A1 | 7/2014 | Lesavich et al. |
| 2015/0019200 A1* | 1/2015 | Woodward et al. ............... 704/2 |
| 2015/0019309 A1 | 1/2015 | Miskell |
| 2015/0066624 A1 | 3/2015 | Astore |
| 2015/0066673 A1 | 3/2015 | Astore |
| 2015/0066689 A1 | 3/2015 | Astore |
| 2015/0066692 A1 | 3/2015 | Astore |

* cited by examiner

PROTOCOL STACK

SOCIAL MEDIA INDEX

SOCIAL COMMERCE

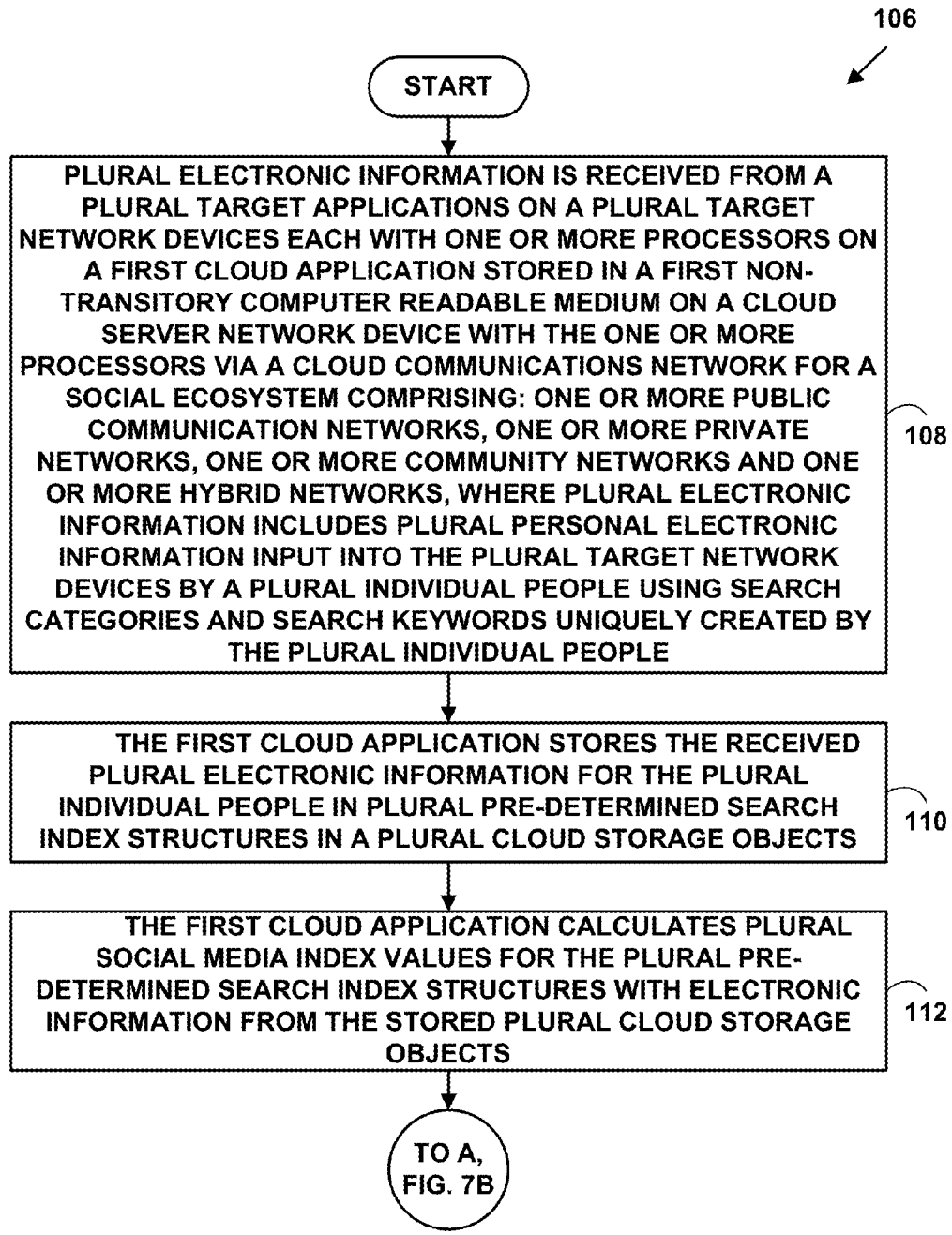

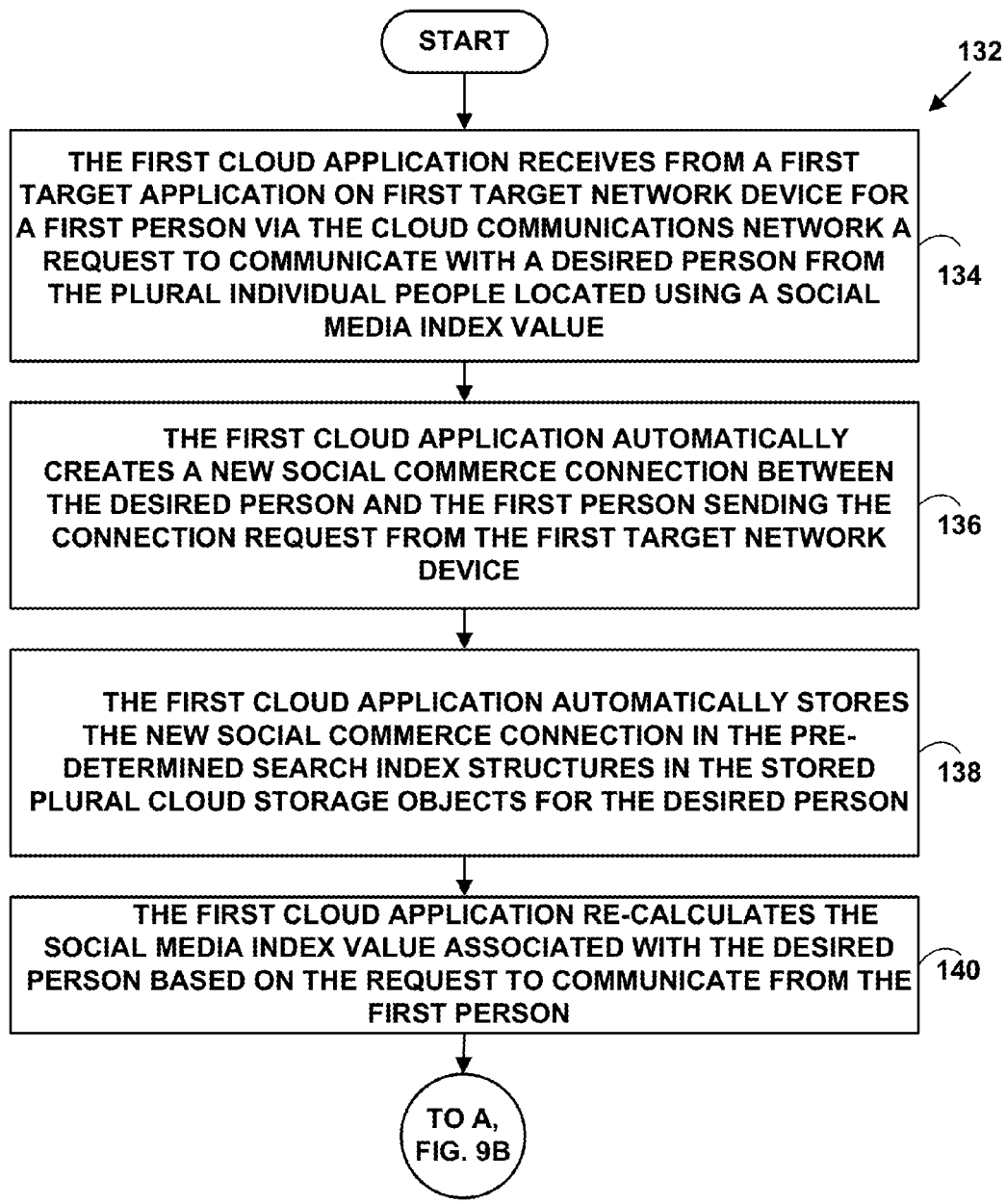

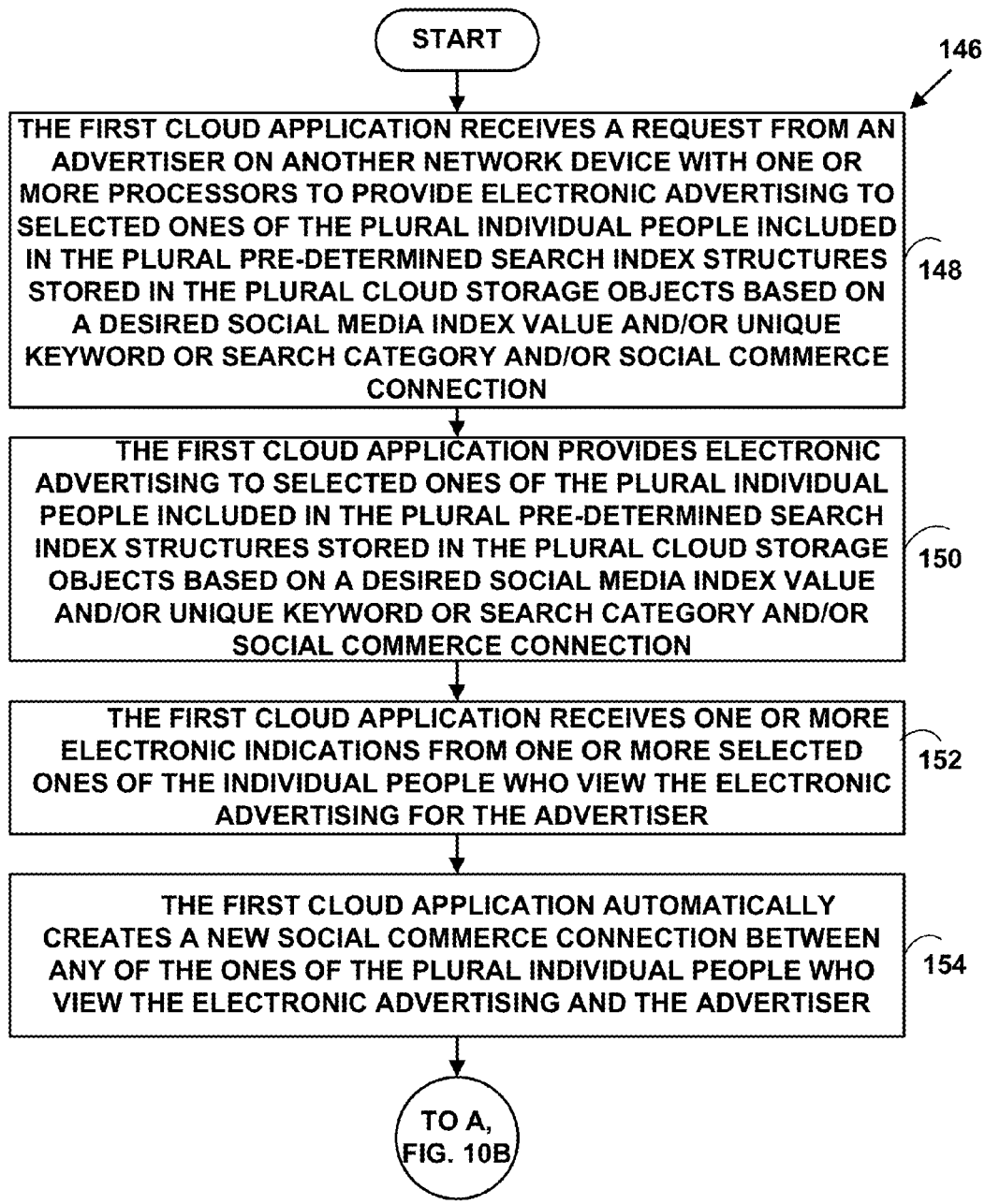

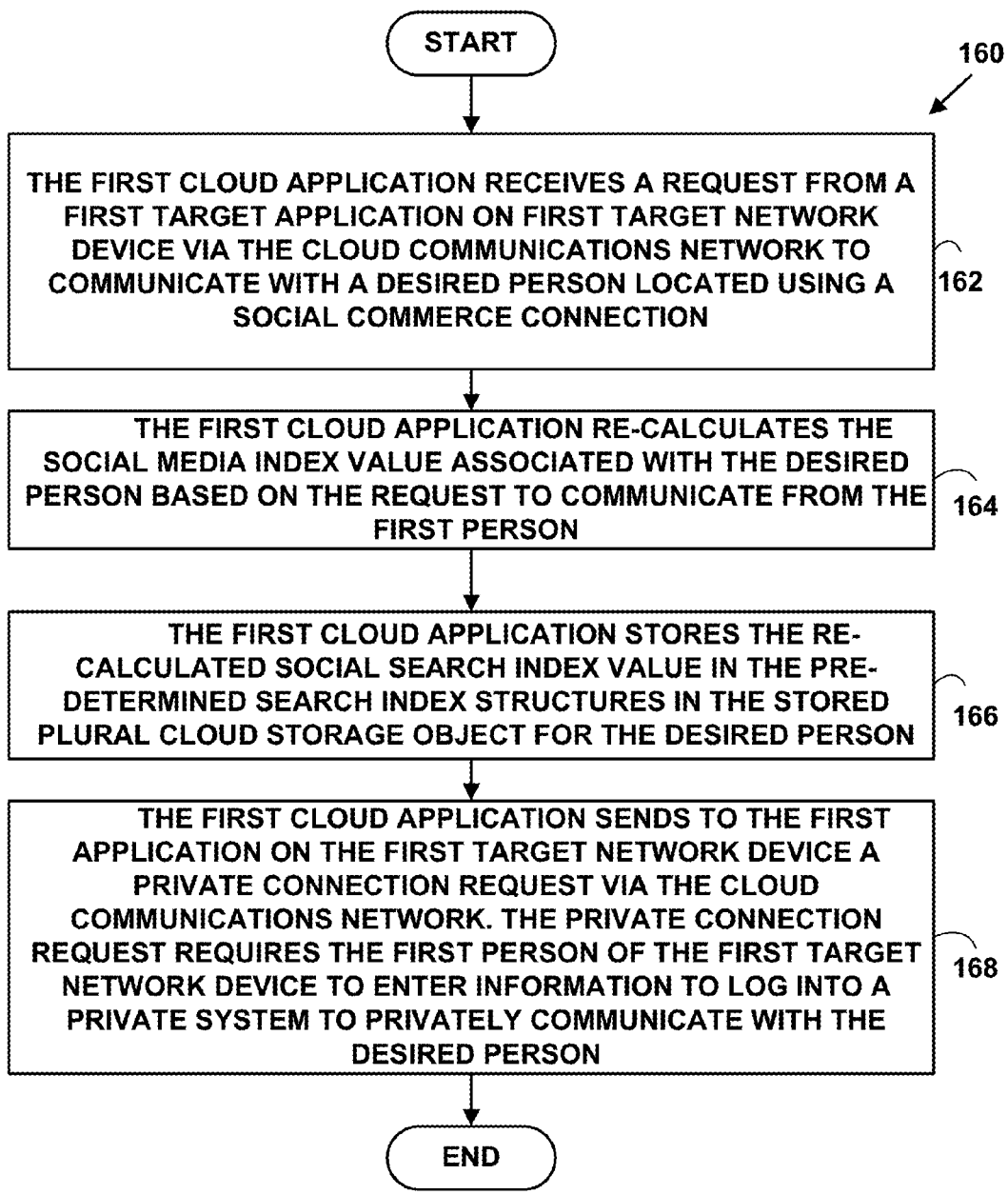

METHOD AND SYSTEM FOR PROVIDING SOCIAL SEARCH AND CONNECTION SERVICES WITH A SOCIAL MEDIA ECOSYSTEM

FIELD OF INVENTION

This invention relates to retrieving electronic information over a computer network. More specifically, it relates to a method and system for providing social search and connection services within a social media ecosystem.

BACKGROUND OF THE INVENTION

Each day over 10,000,000+ related keyword searches are conducted for people trying to find people. If searches for related keywords include electronic white pages, dating and business networking are counted, the total would be over 40,000,000+, which would make searching for people one of the most searched subject categories in the world online.

Today, there are 2.3 billion Internet connected users around the world, and 6 billion mobile device owners and are growing exponentially. Searching and Social Networking is effecting and influencing all users, businesses and advertisers globally.

However, there is not a "top of mind" or superior people search solution to search, connect and communicate with a desired person instantly. Thus, it is desirable to solve some of the problems associated with searching for people online.

SUMMARY OF THE INVENTION

In accordance with preferred embodiments of the present invention, some of the problems associated with search engines are overcome. A method and system for providing social search and connection services within a social media ecosystem is presented.

A desired person can be searched for from public search engines and social media sites directly by name and/or by unique search keywords and search categories created and publically published by the desired person, a social media index of the desired person or a social commerce connection associated with the desired person. The search results are publically viewable. However, communication with the desired person located within the social media ecosystem is via a private system in which a searcher must provide login information to privately communicate with the desired person. The private system helps ensure that social media index values and social commerce connections are properly established, recorded and updated for the desired person and provides a layer of security and privacy. The social media searching ecosystem is provided on a cloud communications network for mobile and non-mobile devices.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A and 7B are a flow diagram illustrating a method for social media ecosystem searching;

FIGS. 9A and 9B are a flow diagram illustrating a method for social media ecosystem searching;

FIGS. 10A and 10B are a flow diagram illustrating a method for social media ecosystem searching; and FIG. 11 is a flow diagram illustrating a method for social media ecosystem searching.

DETAILED DESCRIPTION OF THE INVENTION

Exemplary Cloud Social Media Ecosystem

Figure 1:
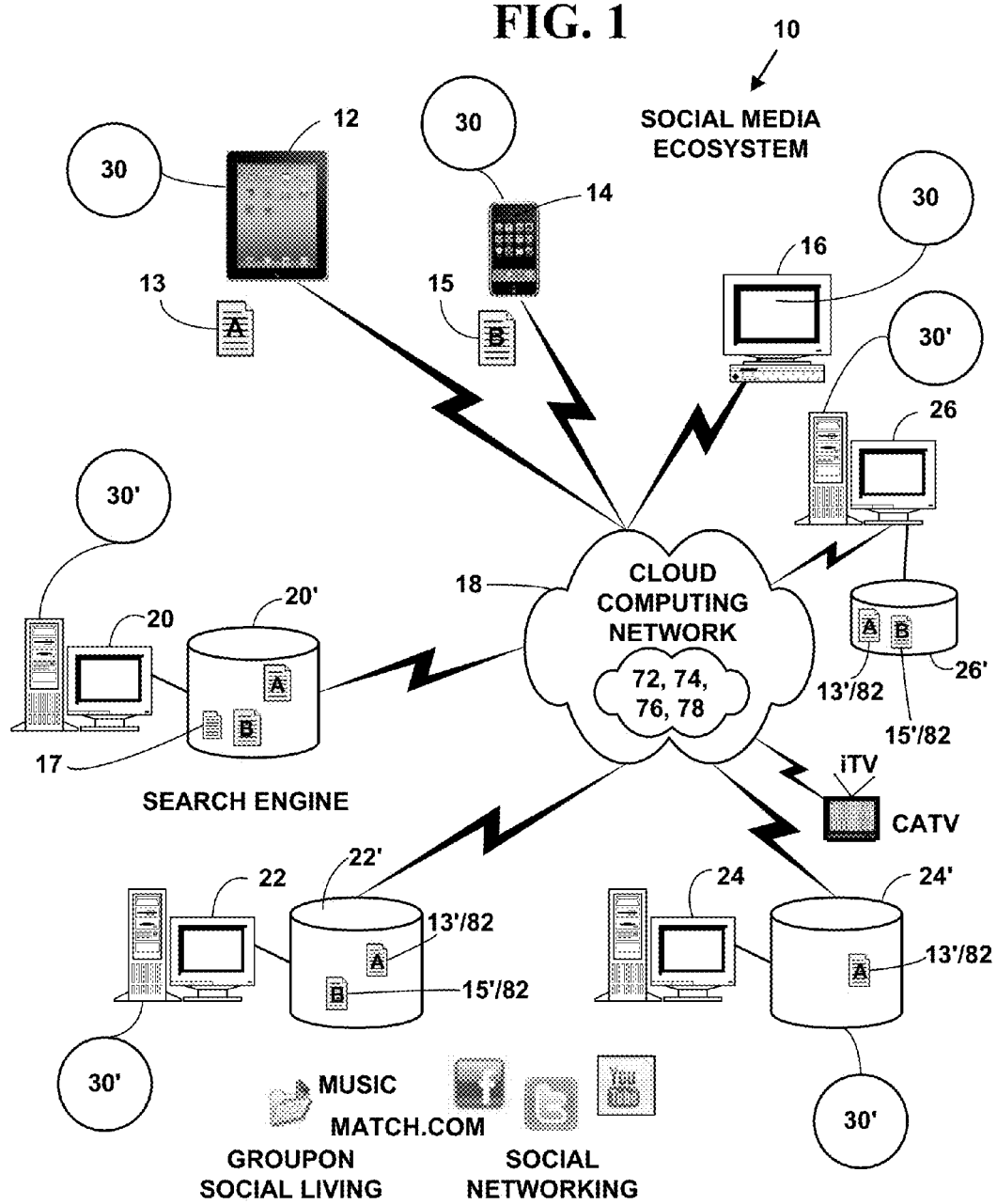
FIG. 1 is a block diagram illustrating an exemplary social media ecosystem system.

FIG. 1 is a block diagram illustrating an exemplary social media ecosystem 10. The exemplary electronic system 10 includes, but is not limited to, one or more target network devices 12, 14, 16 (only three of which are illustrated) each with one or more processors and each with a non-transitory computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions and other types of network devices.

The one or more smart network devices 12, 14, 16 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 12, 14, 16 include tablet computers such as the iPad, by Apple, Inc., the HP Tablet, by Hewlett Packard, Inc., the Playbook, by RIM, Inc., the Tablet, by Sony, Inc.

The target network devices 12, 14, 16 are in communications with a cloud communications network 18 via one or more wired and/or wireless communications interfaces. The cloud communications network 18, is also called a "cloud computing network" herein and the terms may be used interchangeably.

The plural target network devices 12, 14, 16 request desired electronic content 13, 15, etc. stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16 via the cloud communications network 18.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, etc.) store portions 13', 15' of desired electronic content 13, 15 as cloud storage objects 82 (FIG. 5) as is described herein.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary social media ecosystem 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Social Media Ecosystem Display System

Figure 2:
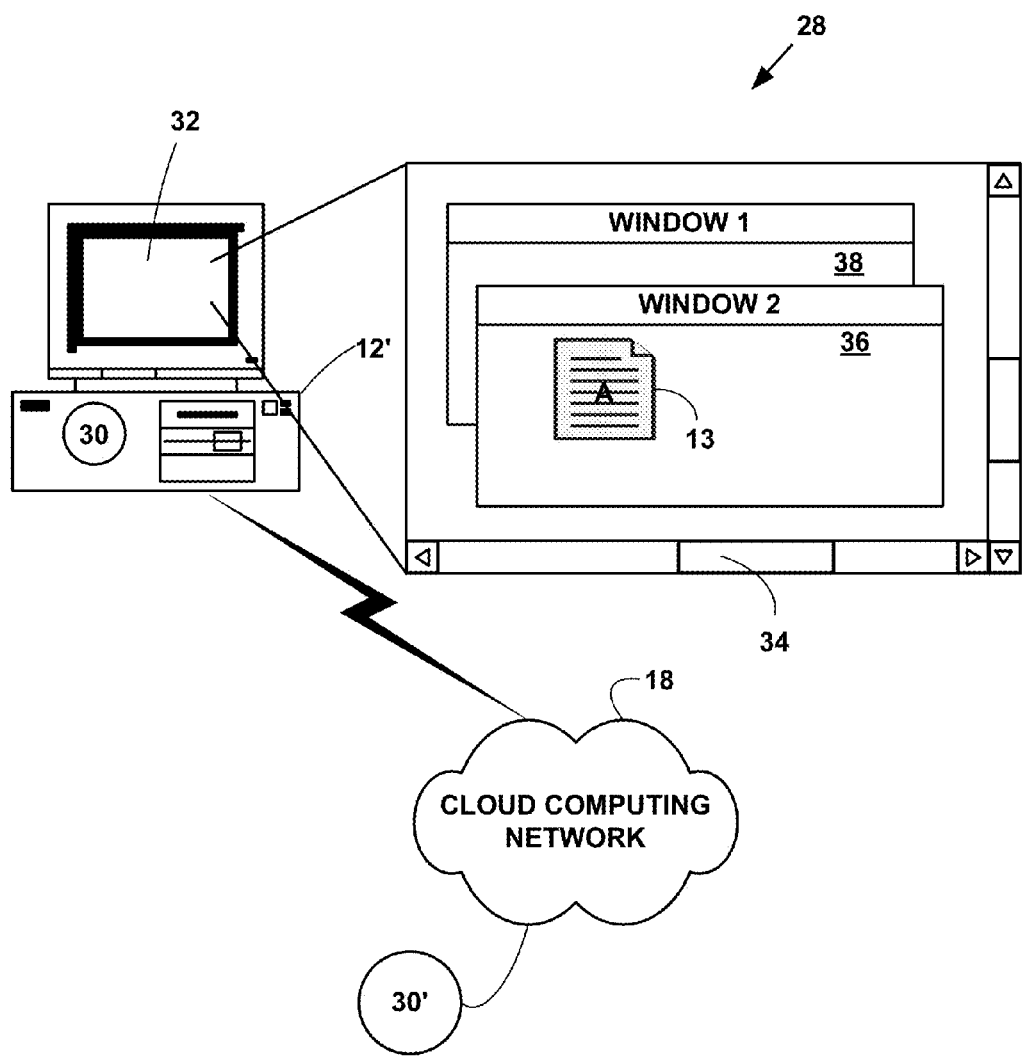
FIG. 2 is a block diagram illustrating an exemplary social media display system.

FIG. 2 is a block diagram illustrating an exemplary social media ecosystem 10 display system 28. The exemplary social media ecosystem display system includes, but is not limited to a target network device (e.g., 12, etc.) with a cloud application 30 and a display component 32. The cloud application 30 presents a graphical user interface (GUI) 34 on the display 32 component. The GUI 32 presents a multi-window 36, 38, etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention In another embodiment, a portion of the cloud application 30 is executing on the target network devices 12, 14, 16 and another portion of the application 30' is executing on the server network devices 20, 22, 24, 26 However, the present invention is not limited these embodiments and other embodiments can be used to practice the invention.

Exemplary Networking Protocol Stack

Figure 3:
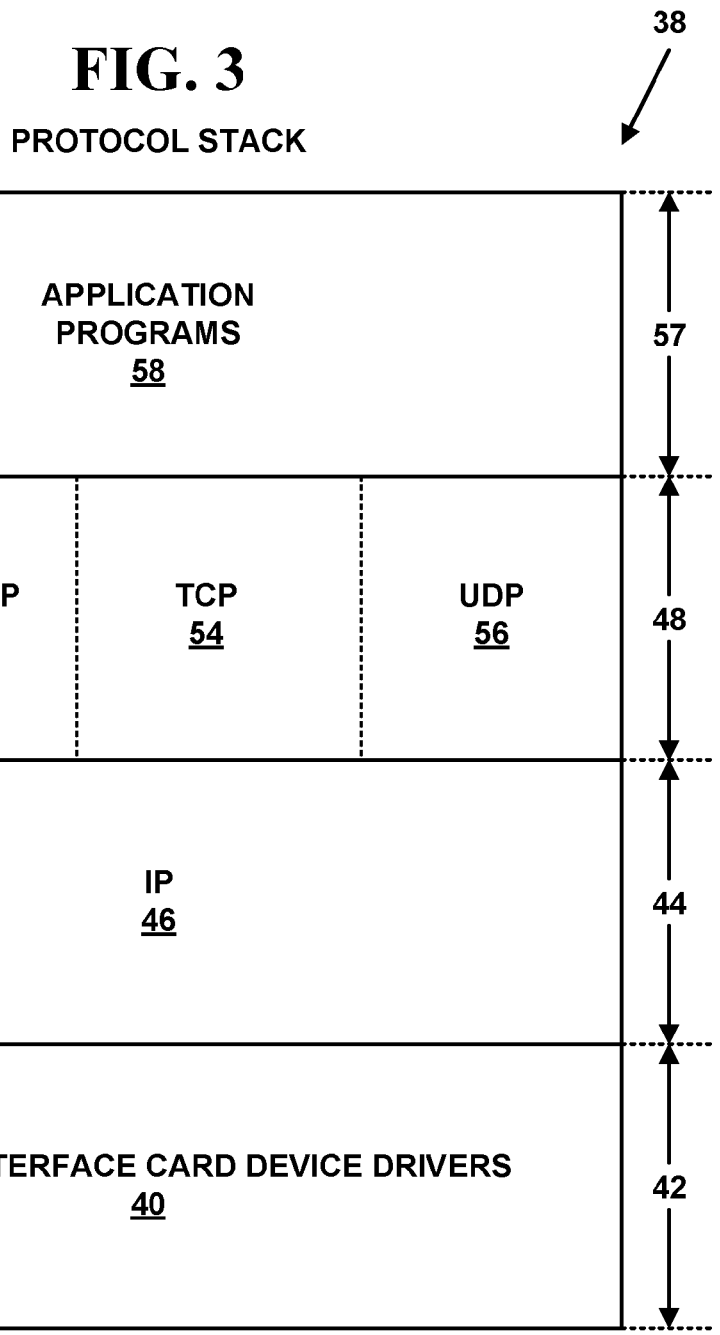
FIG. 3 is a block diagram illustrating an exemplary networking protocol stack.

FIG. 3 a block diagram illustrating a layered protocol stack 38 for network devices in the social media ecosystem 10. The layered protocol stack 38 is described with respect to Internet Protocol (IP) suites comprising in general from lowest-to-highest, a link 42, network 44, transport 48 and application 56 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26 are connected to the communication network 18 with Network Interface Card (NIC) cards including device drivers 40 in a link layer 42 for the actual hardware connecting the network devices 12, 14, 16, 20, 22, 24, 26 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, an Internet Control Message Protocol (ICMP) layer 52, a Transmission Control Protocol (TCP) layer 54 and a User Datagram Protocol (UDP) layer 56. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) carry out desired functionality for a network device reside. For example, the application programs 58 for the client network devices 12, 14, 16 may include a web-browsers or other application programs, cloud application program 30, while application programs 58 for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name www.weca.net.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www-.zigbee.org" respectively.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access.

It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1\times10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multi-carrier transmission NICs. However, the present invention is not limited to this embodiment and 1G, 2G and 3G and/or any combination thereof, with or with 4G NICs can be used to practice the invention.

In one embodiment of the invention, the WiMAX interfaces includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

VoIP is a set of facilities for managing the delivery of voice information using IP packets. In general, VoIP is used to send voice information in digital form in discrete data packets (i.e., IP packets) over data networks rather than using traditional circuit-switched protocols used on the PSTN. VoIP is used on both wireless and wired data networks.

VoIP typically comprises several applications (e.g., Session Initiation Protocol (SIP), Service Location Protocol (SLP), H.323, H.324, Domain Name System (DNS), Authentication Authorization and Accounting (AAA), codecs (G.7xx), etc.) that convert a voice signal into a stream of packets (e.g., IP packets) on a packet network and back again. VoIP allows voice signals to travel over a stream of data packets over a communications network.

Short Message Service (SMS) is a text messaging service component of phone, web, or mobile communication systems, using standardized communications protocols that allow the exchange of short text messages of up to 160 characters, or more.

Instant messaging (IM) is a type of messaging which offers real-time text transmission over a local area network (LAN).

The one or more target network devices 12, 14, 16 and one or more server network devices 20, 22, 24, 26 may communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30' provide cloud social media ecosystem 10 searching services from television services over the cloud communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30' provide cloud social media ecosystem 10 search services from Internet television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30' provide cloud social media ecosystem 10 search services from general search engine services. A search engine is designed to search for information on a cloud communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30' provide cloud Social media ecosystem 10 search services from general search engine services. In another embodiment, the cloud applications 30, 30' provide general search engine services by interacting with one or more other public search engines (e.g., GOOGLE, BING, YAHOO, etc.) and/or private search engine services.

In another embodiment, the cloud applications 30, 30' provide social media ecosystem 10 search services from specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.

Social Networking Services

In one embodiment, the cloud applications 30, 30' provide cloud social media ecosystem 10 search services from one more social networking services including to/from one or more social networking web-sites (e.g., FACEBOOK, YOU-TUBE, TWITTER, MY-SPACE, MATCH.COM, E-HARMONY, GROUP ON, SOCIAL LIVING, PINTEREST, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Music Downloading Services

In one embodiment, the cloud applications 30, 30' provide cloud social media ecosystem 10 search services from one more music downloading services (e.g., iTunes, Rhapsody, etc.) at one or more music downloading sites.

However, the present invention is not limited to the music downloading services described and other public and private social networking services can also be used to practice the invention.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Security and Encryption

Network devices 12, 14, 16, 20, 22, 24, 26 with wired and/or wireless interfaces of the social media ecosystem 10 include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 20, 22, 24, 26) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11x WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
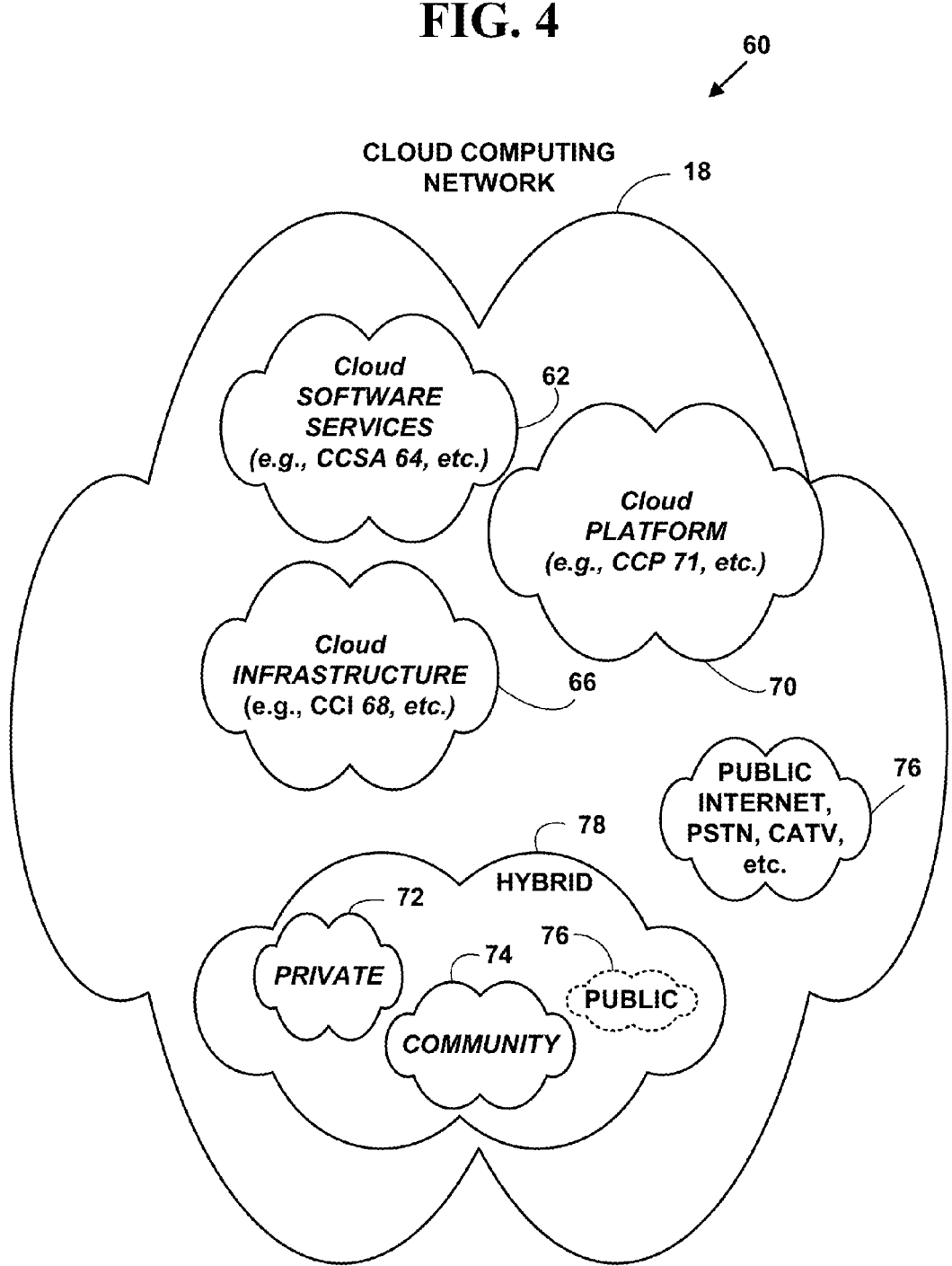
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand social media ecosystem 10 search services. Social media ecosystem searchers can unilaterally provision computing capabilities, such as server time and network storage, as needed automatically without requiring human interaction with each network server on the cloud communications network 18.
2. Broadband network access. Social media ecosystem searching capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G and/or 4G wireless and/or wired and broadband and/or ultra-broad band (e.g., WiMAX, etc.) network access.
3. Resource pooling. Social media ecosystem 10 searching computing resources are pooled to serve multiple requesters using a multi-tenant model, with different physical and virtual resources dynamically assigned and reassigned according to social media ecosystem demand.

TABLE 1-continued

There is location independence in that an requester of a search has no control and/or knowledge over the exact location of the provided by social media ecosystem 10 search resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for the social media ecosystem search. To the social media ecosystem 10 searcher, the social media ecosystem 10 searching capabilities available for provisioning appear to be unlimited and can be used in any quantity at any time.
5. Measured Services. Cloud computing systems automatically control and optimize resource use by leveraging a metering capability at some level of abstraction appropriate to the type of social media ecosystem 10 service (e.g., storage, processing, bandwidth, custom social media ecosystem 10 searching, etc.). Social media ecosystem 10 searching usage is monitored, controlled, and reported providing transparency for both the social media search provider and the social media search requester of the utilized social media ecosystem 10 search service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for a social media ecosystem 10 searching service (CCSA 64). The capability to use the provider's applications 30, 30' running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30' capabilities, with the possible exception of limited user-specific application configuration settings.
2. Cloud Computing Infrastructure 66 for the social media ecosystem 10 searching service (CCI 68). The capability provided to the user is to provision processing, searching storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).
3. Cloud Computing Platform 70 for the social media ecosystem 10 searching service (CCP 71). The capability provided to the user to deploy onto the cloud infrastructure 66 created or acquired applications created using programming languages and tools supported servers 20, 22, 24, 26, etc . . . The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for social media ecosystem 10 searching. It may be managed by the electronic content retrieval or a third party and may exist on premise or off premise.
2. Community cloud network 74. The cloud network infrastructure is shared by several different organizations and supports a specific social media ecosystem 10 search community that has shared concerns (e.g., mission, security requirements, policy, compliance considerations, etc.). It may be managed by the different organizations or a third party and may exist on premise or off premise.

TABLE 3-continued

3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.).
5. Cloud network 18. The cloud communications network further includes cable television networks (CATV), satellite television networks (SATV), three-dimensional television (3DTV) networks, Internet television networks, Web-TV networks and/or Internet Protocol Television (IPtv) networks.

Cloud software 64 for electronic content retrieval takes full advantage of the cloud paradigm by being service oriented with a focus on statelessness, low coupling, modularity, and semantic interoperability for social media ecosystem 10 searching services. However, cloud software services 64 can include various states.

Cloud storage of social media ecosystem 10 searching on a cloud computing network 18 includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', offers cloud services for social media ecosystem 10 search services. The application 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 62 for social media ecosystem 10 search services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
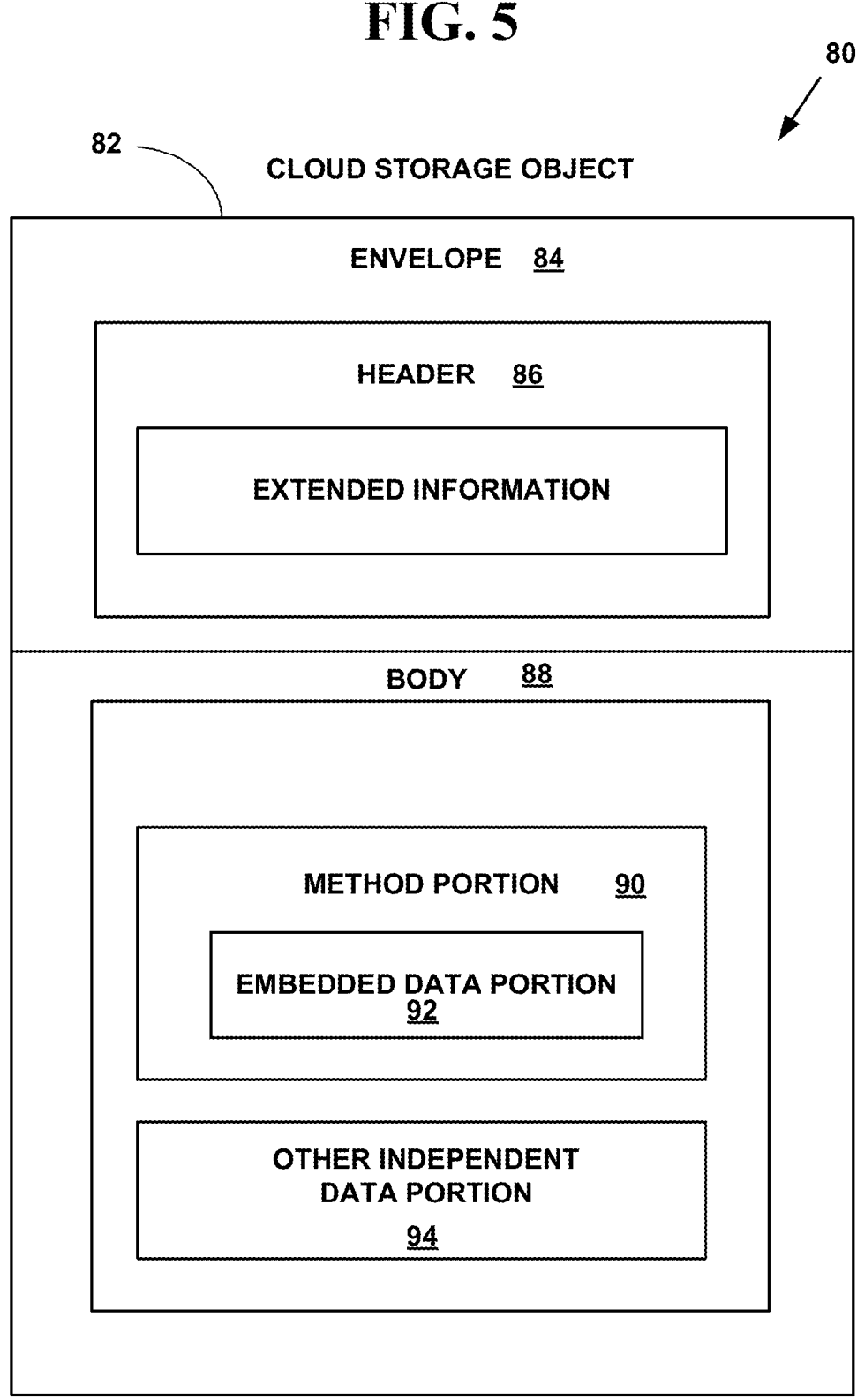
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of meta-data. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval.

X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Search Engine Ecosystem

An electronic search engine ecosystem includes one or more content providers (e.g., web-site providers, etc.), one or more public and/or private search engines (e.g., GOOGLE, BING, YAHOO, etc.) and/or one or more users (e.g., searchers, etc.) However, the present invention is not limited the components describe and more, fewer and/or other components can be used to practice the invention as a search engine ecosystem.

The one more public and/or private search engines 98 include, electronic information gatherers, a search query parser, a search query gatherer, a search query ranker, a search query formatter, A "search engine" is a software system that is designed to search for information on the World Wide Web. The search results are generally presented and referred to as Search Engine Results Pages (SERPs). The information includes web pages, images, information and other types of files. Some search engines also mine data available in databases or open directories. Unlike web directories, which are maintained only by human editors, search engines also maintain real-time information by running different types of search algorithms on web crawlers.

Web search engines function by storing information about many web pages, which they retrieve from the markup language (e.g., HTML, XML, etc.) the web pages are written in. These pages are retrieved by an automated program called a spider, web-crawler, web-bot, that follows every link on the site. The contents of each page are then analyzed to determine how it should be indexed (for example, words can be extracted from the titles, page content, headings, or special fields called meta tags). Data about web pages are stored in an index database for use in later queries. A query from a user can be a single word. The index helps find information relating to the query as quickly as possible.

Some search engines, such as GOOGLE, store all or part of the source page (referred to as a cache) as well as information about the web pages, whereas other search engines store every word of every page they find. This cached page holds the actual search text since it is the one that was actually indexed, so it can be very useful when the content of the current page has been updated and the search terms are no longer in it.

When a user enters a query into a search engine using one or more keywords, the search engine examines its index and provides a listing of best-matching web pages according to its criteria, usually with a short summary containing the document's title and sometimes parts of the text. The index is built from the information stored with the data and the method by which the information is indexed.

Most search engines support the use of the Boolean operators AND, OR and NOT to further specify the search query. Boolean operators are for literal searches that allow the user to refine and extend the terms of the search. The engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the search result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

"Search engine optimization (SEO)" is the process of affecting the visibility of a website or a web page in a search engine's "natural" or un-paid ("organic") search results. In general, the earlier (or higher ranked on the search results page), and more frequently a site appears in the search results list, the more visitors it will receive from the search engine's users.

Social Media Ecosystem

An "ecosystem" with respect to a communications network 18, is a community of participates (e.g., web page providers, indexers (e.g., search engines, etc.) and searchers in conjunction with the technology components of their environment (e.g., servers, gateways, routers, switches, wired interfaces, wireless interfaces, target network devices, (e.g., smart phones, tablets, etc.), etc.), interacting as a system. The ecosystem components are regarded as linked together through communications and data flows. Ecosystems are controlled by both internal and external factors.

A "digital social media ecosystem" is a distributed, adaptive, open socio-technical system with properties of self-organization, scalability and sustainability inspired from natural ecosystems. Digital ecosystem models are informed by knowledge of natural ecosystems, especially for aspects related to competition and collaboration among diverse entities.

One framework for digital ecosystems includes three distinct levels. Level 1 of the framework describes what drives individuals to carry out actions in online communities such as posting messages and adding electronic content. Level 2 looks at the cognitions participants use to determine whether or not to take such actions. Level 3 looks at the methods by which participates go about carrying out the action in the digital ecosystem environment.

A "social search ecosystem" typically operates within three perspectives: content providers, indexers, and searchers. That is, each member of the search ecosystem has a set of objectives and priorities that determine criteria when participating in the ecosystem. Participates will only participate in a search ecosystem if there is a tangible benefit, i.e., a payoff or return on investment (ROI).

Any member of the search ecosystem may reorganize (e.g., optimize, etc.) a search resource according to his own perspective. Searchers do this by changing the way they search. Indexers (e.g., search engines, etc.) do this by (excluding or including content, changing indexing structures, adjusting ranks, etc.). Content providers do this by changing content.

Social media ecosystems facilitate and automate vast interactions, connections and networks of people by enabling collaboration at any time. This new ecosystem almost completely eliminates the need for travel and direct personal interactions. Within this new ecosystem there are individual influencer ecosystems with their own dynamics interrelationships, characteristics and influence models.

Social media ecosystems include a new business-to-person (B2P) paradigm. Mohan Sawhney, author of The Global Brain reinforces this in his book, "social customers are driving innovation, they are empowered and collaborative, they are the drivers and initiators of innovation and are increasingly viewed as a strategic asset to companies. Today's customer is looking for a personalized experience and relationship, demanding solutions rather than products," in what he calls the global Bazaar.

As social media ecosystem 10 is also a place to present social "needs" in social, career or leisure activities, for the benefit of oneself and others individuals and businesses that feel that can satisfy that need, per search, and review of a public profile.

Social Media Index

There are a number of definitions of Social Indicators (SI) both from self evaluation, to physical activity data capture to expression of others feedback or recommendations. SIs are forms of evidence that help assessment of present position and future directions. An SI is also a "direct and valid statistical measure which monitors levels and changes over time in a fundamental social concern." A social concern is "an identifiable and definable aspiration or concern of fundamental and direct importance to human well-being." Indicators may be material, such as numbers related to economic growth, and/or immaterial, such as values or goals. An SI includes statistics which are intended to provide a basis for making concise, comprehensive and balanced judgments about the conditions of social connections.

The kind of indicators chosen for SI empirical measurement depends on the purpose of the measure. While "objective social indicators" are statistics which represent social facts independent of personal evaluations, "subjective social indicators" are measures of individual perceptions and evaluations of social conditions.

"Objective social indicators" represent social facts independently of personal evaluations. "Subjective social indicators" are based on individual perception and evaluation of social conditions. Generally, SI perform one or more of three functions: (1) providing a basis for information for decision-making; (2) monitoring and evaluating policies; and/or (3) searching for a common goal and deciding how to reach it.

A "social media index" and/or a "social inclusion index" is a framework for measuring multiple dimensions of social connections. It measures social connections with public figures in politics, sports, entertainment, etc. and with private figures such as friends, relatives, real and virtual acquaintances. In one embodiment, it includes both objective and subjective social indicators. In another embodiment, it includes only objective social indicators. In another embodiment, it includes only subjective social indicators. However, the present invention is not limited to the social indices described, and more fewer and other types of social indices can be used to practice the invention.

In one embodiment of the invention, an exemplary social media index includes a measure of a person's connections to "friends." Table 4 illustrates an exemplary four dimensional (4D) or four deep friend social media index. This 4D social media index is exemplary only and other types and more, fewer or other dimensions can be used for the social media index.

TABLE 4

SUSAN ORLEAN - Social media index - The New Yorker - Nov. 5, 2010

1. The friend you know well, have encountered frequently in the flesh, perhaps even hugged, have visited domestically, and would invite to your child's wedding, and with whom, coincidentally, you might occasionally communicate via social media in addition to more traditional friend channels such as lunch dates, telephone calls, et cetera (formerly known simply as "a friend")
2. The friend you sort of know, because you have friends in common and have maybe attended the same events-not together, but you've both ended up there because you know a lot of the same people. You perhaps would not have thought to invite this person to a small party, and yet you do include him in your wider sense of your social circle-and you now communicate with him via social media more than you ever did before such a thing existed, and you now have a surprising intimacy after years of static, unenergetic just-sort-of-knowing one another (formerly known as "an acquaintance")
3. The friend, or friend-like entity, whom you met initially via FACEBOOK or TWITTER or GOOREADS or, heaven help us, MySpace. You met-online, that is-because . . . well, who remembers now, anyway? Maybe through some friend of a friend of a friend, or because some algorithm on Facebook "suggested" that you should be friends. In any case, you now interact with this person/stranger frequently-in fact, maybe many times a day-and, as a result, she enters your conversation the way anyone would with whom you exchange chitchat several times a day. When a real flesh-based friend asks you who this person is, you describe her as a friend, for lack of a better word. It's an awkward description because you have a) never met in real life b) might not actually know this person's full name or profession or background. Yet you look forward to interacting with this person, and if/when she mentions experiencing a sad event, a birthday, a job loss, a cute baby experience, or a car accident, you have a strong, actual reaction (this sort of friendship formerly had no name at all, since the only kind of liaison that even comes close to this in the history of human relations is that of pen pals)
4. The friend-like entity mentioned in No. 3-that is, someone whom you know only virtually-but in this instance you and this person have actually met. The meeting was probably brief and a one-off encounter and it probably occurred because one of you happened to be passing through the other's hometown. When you finally meet, you spend most of your time chuckling over how much smaller/taller you look in your profile picture.

Figure 6A:
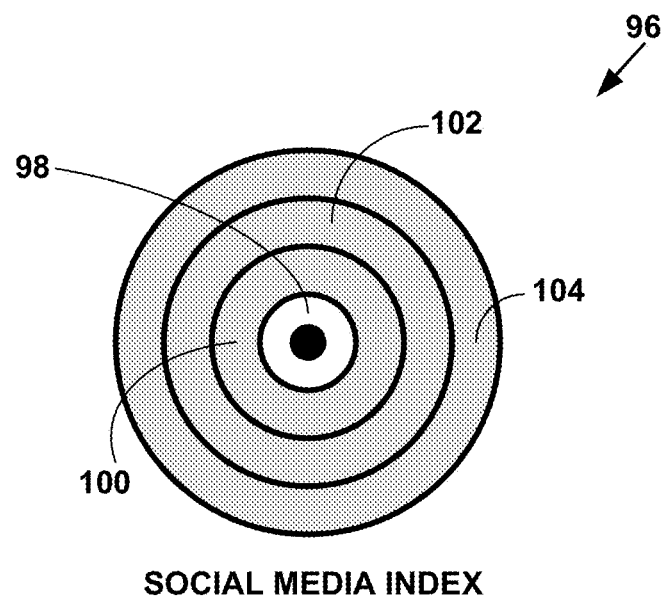
FIG. 6A is a block diagram illustrating an exemplary social media index.

FIG. 6A is a block diagram illustrating an exemplary four dimensional (4D) social media index 96. The social media index 96 includes a first set of connections 98, a second set of connections 100, a third set of connections 102 and a fourth set of connections 104. However, the present invention is not to the social indices described, and more fewer and other types of social indices can be used to practice the invention.

In one exemplary embodiment of the social media index 96, the first set of connections 98 is a most important set of connections and is assigned a largest numeric percentage. The second set of connections 100 is second most important and is assigned a second numeric percentage. The third set of connections 102 is third most important and is assigned a third numeric percentage. The fourth set of connections 104 is least important and is assigned a smallest numeric percentage. However, the present invention is not to a social media index 96 described, and more fewer and other types of set of connections can be used to practice the invention.

In one exemplary embodiment of the invention, an exemplary social media index 96 includes a four deep measure of social, career and leisure categories. Such an embodiment is illustrated in FIG. 6A. FIG. 6A illustrates four categories or spheres of influence. As an example for the social category sphere: (1) or the closet sphere 98 to the center illustrates people who you call in emergency and/or are highly influential and supportive in daily life; (2) includes a second sphere 100 of people whom you have contact with at least monthly for meaningful experience; (3) includes a third sphere 102 of people know on a first name basis, no set pattern of interaction with but put would gladly accept your contact or phone call or communication; (4) includes a fourth sphere 104 of people you have a direct connection with but do not fall into the above definition or pattern of contact of influential meaning in your life. However, the present invention is not to the social indices described, and more fewer and other types of social indices can be used to practice the invention Table 5 illustrates an exemplary four dimensional (4D) and/or friend social media index 96. This 4D social media index 96 is exemplary only and other types and more, fewer or other percentages can be used for the social media index 96.

TABLE 5

| | |
|---|---|
| 1. First set of connections 98 = | 60% |
| 2. Second set of connections 100 = | 25% |
| 3. Third set of connection 102 = | 10% |
| 4. Fourth set of connections 104 = | 5% |

A simple social media index 96 value is calculated by Equation (1). However, the present invention is not to a social media index 96 described, and more fewer and other types of set of connections can be used to practice the invention.

social media index value=(number of connections in the first set of connections*0.60)+(number of connections in the second set of connections*0.25)+(number of connections in the third set of connections*0.10)+(number of connections in the fourth set of connections*0.05) (1)

For example, if person A had 44 people in her first set of connections 98, people in her second set of connections 100, 99 people in her third set of connections 102 and 1,302 people in her fourth set of connections, using Equation (1) her exemplary social media index 96 value would be (44*0.60)+(10*0.25)+(99*0.10)+(1,032*0.05)=90.4.

For example, if person B had 1,032 people in her first set of connections 98, 10 people in her second set of connections 100, 99 people in her third set of connections 102 and 5,001 people in her fourth set of connections, using Equation (1) her exemplary social media index 96 value would be (1,032*0.60)+(10*0.25)+(99*0.10)+(5001*0.05)=972.05.

In one embodiment, the first set of connections 98 includes only other people that are "well-known" and/or "famous" in politics, entertainment, sports, etc. that would recognize the person by name and consider them a friend if asked. However, the present invention is not to a social media index 96 described, and more fewer and other types of set of connections can be used to practice the invention. In such an embodiment, first cloud application 30' dynamically maintains a list of "well-known" and/or "famous" people.

For example, in such an embodiment, the first set of connections 98 for a person may include President Obama, because the person took a class from Professor Obama when he was law school professor at the University of Chicago, include Tom Brady, Quarterback of the New England Patriots because he was a classmate at the University of Michigan, and include Jennifer Aniston the actress, because she was the next store neighbor of his sister, etc.

In another embodiment, the first set of connections 98 includes only other people that would recognize the person by name and consider them a friend if asked. Such people would also have some type of contact information for the person include an e-mail address, a phone number, etc.

However, the present invention is not to a social media index 96 described, and more fewer and other types of set of connections can be used to obtain a social media index value to practice the invention.

Social Commerce Connections

"Social commerce" is a subset of electronic commerce that involves using social media, online media that supports social interaction, and user contributions to assist in creating social connection as well as the online buying and selling of products and services.

Figure 6B:
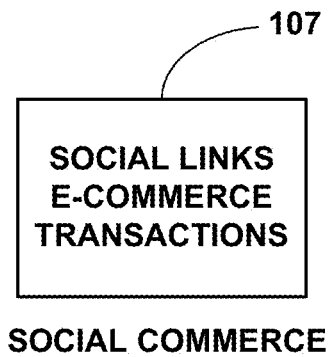
FIG. 6B is a block diagram illustrating an exemplary social commerce connection.

FIG. 6B is a block diagram 105 illustrating an exemplary social commerce connection 107. However, the present invention is not to the social commerce connect described, and more fewer and other types of social commerce connections can be used to practice the invention A social commerce connection 107 (FIG. 6B) is the use of social network(s) for e-commerce transactions. Social commerce include online collaborative tools such as shared pick lists, viewing advertising, user ratings and other user-generated content-sharing of online goods and services information and advice.

Examples of social commerce include, but are not limited to, customer ratings and reviews, user recommendations and referrals, social shopping tools (e.g., sharing the act of shopping online, etc.), forums and communities, social media optimization, social applications and social advertising.

One way to categorize social commerce is Offsite and Onsite social commerce. "Offsite social commerce" includes activities that happen outside of a good or service provider's website. These may include electronic storefronts, posting products on FACEBOOK, TWITTER, PINTEREST, and other social networks, advertisement etc. However, many large brands seem to be abandoning that approach. The poor performance has been attributed to the lack of purchase intent when users are engaged on social media sites which were designed to interact with other people and not to purchase products.

"Onsite social commerce" refers to retailers including social sharing and other social functionality on their website. Some notable examples include ZAZZLE which enables users to share their purchases, MACY'S which allows users to create a poll to find the right product, and FAB.COM which shows a live feed of what other shoppers are buying. Onsite user reviews are also considered a part of social commerce.

The 2011 BankInter Foundation for Innovation conference on Social Technologies discussed six C's of Social Technologies including content, community, commerce, context, connection and conversation.

Content—The basic need to engage with customers, prospects and stakeholders through valuable published content on the web. Early examples of this were the brochure sites for organizations and this has matured into a vast and growing body of material being published in real time onto the web. GOOGLE and UNITTUS are organizations that have been at the forefront of indexing and making findable content on the web.

Community—Treating the audience as a community with the objective of building sustainable relationships by providing tangible value. Early incarnations of Community were mobilized through registration and engaged via email programs, this evolved into online forums, chat-rooms and membership groups where users were able to interact with each other, an early example being YAHOO GROUPS. Social Networks are the latest incarnation of community and of the many networks FACEBOOK and TWITTER are the leading organization providing the platform for interpersonal interactions.

Commerce—Being able to fulfill customers' needs via a transactional web presence, typically online retailers, banks, insurance companies, travel sales sites provide the most useful business-to-consumer services. Business-to-business sites range from online storage and hosting to product sourcing and fulfillment services. AMAZON.com emerged in the 90's and has gone on to dominate the B2C commerce space extending its services beyond traditional retail commerce.

Context—The online world is able to track real-world events and this is primarily being enabled by mobile devices. An online bill payment via Google Checkout or a check in at a physical location via FACEBOOK or FOURSQUARE links a real world event to an online data entity such as a business or a place. This is a vital element to Social Commerce where the data is now available to organizations wishing to provide products and services to consumers.

Connection—The new online networks are defining and documenting the relationships between people—these relationships may originate in the physical world or online and may manifest in the other as a result of a connection in the first. LINKEDIN, FACEBOOK, TWITTER and UNITTUS are prime examples of online networks—Professional, Social and Casual. The relationships, the scope of those relationships and the interactions between individuals are a basis for the actions of Social Commerce. UNITUS uWorld Community includes search, connect, communicate and prosper together, instantly with an open public format, so people can connect with and individual or the community at large instantly.

Conversation—All markets are conversations—this may now be reversed for Social Commerce to say that all conversations are markets. A conversation between two parties will likely surface a need that could be fulfilled, thus providing a potential market for supplier organizations. The challenge is for suppliers to be able to tap into those conversations and map those into the range of products and services that they supply. Simple examples of such 'conversations that indicate demand' are where people place objects of desire on their PINTERST board, a "LIKE" of an item inside FACEBOOK or re-tweeting a TWEET on TWITTER.

The elements of social commerce include but are not limited to, reciprocity, community, social proof, authority, liking and scarcity.

Reciprocity—When a company gives a person something for free, that person will feel the need to return the favor, whether by buying again or giving good recommendations for the company.

Community—When people find an individual or a group that shares the same values, likes, beliefs, etc., they find community. People are more committed to a community that they feel accepted within. When this commitment happens, they tend to follow the same trends as a group and when one member introduces a new idea or product, it is accepted more readily based on the previous trust that has been established Social proof—To receive positive feedback, a company needs to be willing to accept social feedback and to show proof that other people are buying, and like, the same things that I like. This can be seen in a lot of online companies such as eBay and Amazon, that allow public feedback of products and when a purchase is made, they immediately generate a list showing purchases that other people have made in relation to my recent purchase. It is beneficial to encourage open recommendation and feedback. This creates trust for you as a seller. 55% of buyers turn to social media when they're looking for information.

Authority—Many people need proof that a product is of good quality. This proof can be based on the recommendations of others who have bought the same product. If there are many user reviews about a product, then a consumer will be more willing to trust their own decision to buy this item.

Liking—People trust based on the recommendations of others. If there are a lot of "likes" of a particular product, then the consumer will feel more confident and justified in making this purchase.

Scarcity—If a person is convinced that they are purchasing something that is unique, special, or not easy to acquire, they will have more of a willingness to make a purchase. If there is trust established from the seller, they will want to buy these items immediately. This can be seen in the cases of ZARA and APPLE who create demand for their products by convincing the public that there is a possibility of missing out on being able to purchase them.

In a social commerce and social media ecosystem everybody is connected from a economic/financial standpoint regardless of how they became a member. Everything they do would have a financial connection to others within the platform on a global basis.

Social Media Ecosystem Information Creation and Searching

Figure 7B:
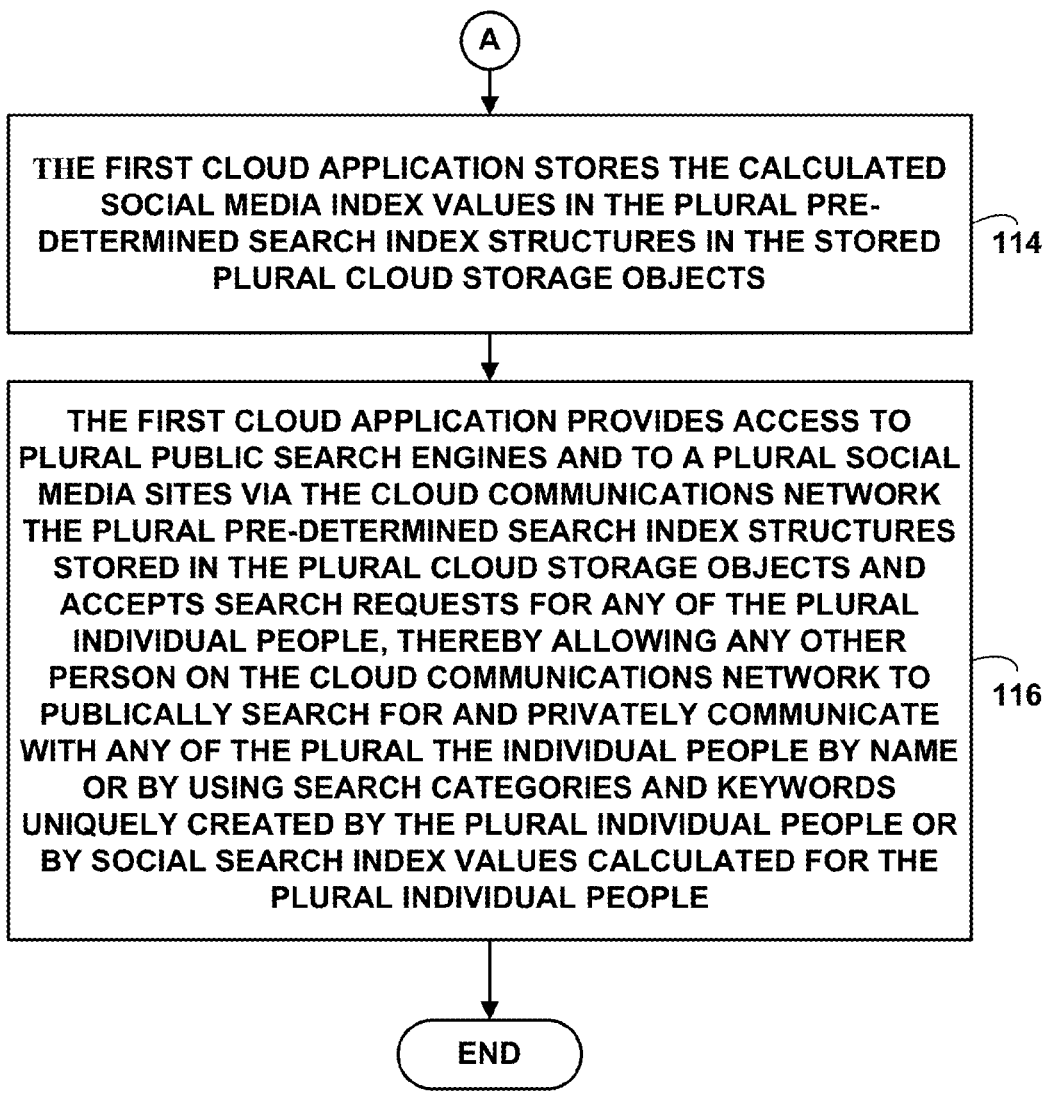

FIGS. 7A and 7B are a flow diagram illustrating a Method 106 for social media ecosystem searching. In FIG. 7A at step 108, plural electronic information is received from plural target applications on plural target network devices each with one or more processors on a first cloud application stored in a first non-transitory computer readable medium on a cloud server network device with the one or more processors via a cloud communications network comprising: one or more public communication networks, one or more private networks, one or more community networks and one or more hybrid networks. The plural electronic information includes plural personal electronic information input into the plural target network devices by a plural individual people using search categories and search keywords uniquely created by the plural individual people. At Step 110, the first cloud application stores the received plural electronic information for the plural individual people in plural pre-determined search index structures in plural cloud storage objects. At Step 112, the first cloud application calculates plural social media index values for the plural pre-determined search index structures with electronic information from the stored plural cloud storage objects. At Step 114, the first cloud application stores the calculated social media index values in the plural pre-determined search index structures in the stored plural cloud storage objects. At Step 116, the first cloud application provides access to plural public search engines and to plural social media sites via the cloud communications network the plural pre-determined search index structures stored in the plural cloud storage objects and accept search requests for any of the plural individual people. This allows any other person on the cloud communications network to publically search for and privately communicate with any of the plural the individual people by name or by using search categories and keywords uniquely created by the plural individual people or by social search index values calculated for the plural individual people.

Method 106 is illustrated with an exemplary embodiment. However, the present invention is not limited to the exemplary embodiment and other embodiments can be used to practice the invention.

In such an exemplary embodiment in FIG. 7A at Step 108, plural electronic information 13,15 is received from plural target applications 30 on plural target network devices 12, 14, 16 each with one or more processors on a first cloud application 30' stored in a first non-transitory computer readable medium on a cloud server network 20 device with the one or more processors via a cloud communications network 18 comprising: one or more public communication networks 76, one or more private networks 72, one or more community networks 74 and one or more hybrid networks 78. The plural electronic information 13, 15 includes plural personal electronic information input into the plural target network devices 12, 14, 16 by plural individual people using search categories including a full name of a desired person, etc. and search keywords uniquely created by the plural individual people.

In one embodiment, the plural electronic information 13, 15 includes professional information, personal information, social information and hobby/leisure information. However, the present invention is not limited to this embodiment and more, fewer or other types of information can be used to practice the invention.

In one embodiment, the plural electronic information 13, 15, is fully visible and/or fully publically available anywhere on the cloud communications network. In such an embodiment, users of the target network devices 12, 14, 16, cannot create aliases and/or post their information anonymously and must use their real name. This allows the plural electronic information 13, 15 to be publically available but any communications to be private. This helps ensure any person who enters his/her information can be publically located, but the individual person decides whether or not he/she will privately communicate with a person who has located them and now desires to communicate with them. However, the present invention is not limited to this embodiment and other embodiments can be used to practice the invention For example, Miss Katherine A, is a user of target device 12 and is a divorced 40 year old female who loves kids, but has no kids of her own has a desire to find a man to date. She has blonde hair, blue eyes, is a runner that only runs in NIKE Free running shoes. She only drinks ICE MOUTAIN water. She has a brown MIKI dog. She hates baseball, but is an avid CHICAGO BEARS football fan. She only drinks coffee on Wednesday mornings from 8:00 am until 8:30 am. She only wears JIMMY CHO high heel shoes to work.

So Miss Katherine A will send her in her electronic information including a unique set of key words and search categories she creates. Her unique set of key words will include, divorced, 40 year old female, runner, NIKE FREE running shoes, ICE MOUNTAIN water, brown MIKI, CHICAGO BEARS fan, coffee Wednesday mornings only from 8:00 am until 8:30 pm; Work Shoes—JIMMY CHO only. Her search categories will include, dating, running, running shoes, dogs, football, am coffee, high-heel shoes, etc. They will all be connected to Miss A by the exact spelling of her full name.

In one embodiment, the plural electronic information 13, 15 received from the plural target applications 30 on the plural target network devices 12, 14, 16 includes a list of social connections for the user of the target network device 12, 14, 16. In such an embodiment the list of social connections are automatically categorized by the first cloud application 30' into four categories to be used with a social media index 96 as is illustrated in FIG. 6A. However, the present invention is not limited to the exemplary embodiment and other embodiments can be used to practice the invention.

In another embodiment, the plural electronic information 13, 15 received from the plural target applications 30 on the plural target network devices 12, 14, 16 includes a list of social connections for the user of the target network device 12, 14, 16. In such an embodiment the list of social connections are manually categorized by users of the target network devices 12, 14, 16 into categories to be used with the social media index 96 as is illustrated in FIG. 6A. In such an embodiment, the users of the target devices calculate their own social media index 96 values and send them to the first cloud application 30' for storage. However, the present invention is not limited to the exemplary embodiment and other embodiments can be used to practice the invention.

At Step 110, the first cloud application 30' stores the received plural electronic information 13, 15 for the plural individual people in plural pre-determined search index structures 88 in plural cloud storage objects 82. However, the present invention is not limited to cloud storage objects 82 of the search index structures 88 described and other data structures, for cloud and non-cloud communication networks can be used to practice the invention.

In one embodiment, at Step 110, the first cloud application 30' automatically translates the received plural electronic information into a plural different languages (e.g., automatically translates a user base language, such as English into French, German, Chinese, Japanese, Italian, Swahili, and 30+ other languages) and also stores the translated plural electronic information in the plural cloud storage objects 82. In such an embodiment, the received plural electronic information can be searched globally in virtually any language from anywhere on the cloud communications network 18. However, the present invention is not limited to the exemplary embodiment and other embodiments can be used to practice the invention which does not include automatic translation.

At Step 112, the first cloud application 30' automatically calculates plural social media index values 96 for the plural pre-determined search index structures 88 with electronic information from the stored plural cloud storage objects 82 (e.g., see Table 2 and Equation (1)).

At Step 114, the first cloud application 30' stores the calculated social media index values 96 in the plural pre-determined search index structures 88 in the stored plural cloud storage objects 82.

At Step 116, the first cloud application 30' provides access to plural public search engines 22, 26 (e.g., GOOGLE, BING, ASK, YAHOO, UNITTUS, etc.) and to plural social media sites 24 (e.g., FACEBOOK, YOUTUBE, TWITTER, MATCH.COM, E-HARMONY.COM, PINTEREST, etc.), to cable and Internet television services, to music downloading services, etc. via the cloud communications network 18 the plural pre-determined search index structures 88 stored in the plural cloud storage objects 82 and accept search requests for any of the plural individual people. This allows any other person on the cloud communications network 18 to publically search for and privately communicate with any of the plural the individual people directly by name and/or by using search categories and keywords uniquely created by the plural individual people or by social search index values 96 calculated for the plural individual people. The private communication requirement also provides several layers of privacy and security for the individual people being search for by member of the general public.

For example, Mr. B, a single 42 year old wants to date woman 40 years old with blonde hair and has mixed breed dog that only gets along with brown MIKI dogs. Because of his schedule, he can only meet for coffee on Wednesday mornings and would like to meet a woman who also likes JIMMY CHO shoes because he is a salesman for JIMMY CHO. Brown JIMMY CHO shoes are her (e.g., Ms. Katherine A) favorite.

When Mr. B enters his search request in GOOGLE, the search results GOOGLE returns will include the social profile for Miss Katherine A as the keywords and search criteria entered by Miss A will match the search string entered by Mr. B.

As another example, Mr. B happens to see a magazine article that includes a story about Miss Katherine A and her brown MIKI dog. So Mr. B can search for Miss Katherine A directly by name.

Although it is possible to search some of the categories and/or keywords on existing search engines and social media sites, most sites do not allow a user to create unique and custom keywords, categories or their own search strings and connect them directly to a person's name In addition, such search engines and sites do not allow the unique level of detail as the present invention. For example, no site would allow a color of a dog, or a day and time period for drinking coffee, to be entered and searched in association with a search for a person by the exact spelling of their name.

As another example, Ms. C a 50 year old divorced woman only wants to date men who are very socially connected. So she will enter a search request in GOOGLE for man with a social media index 96 value of 980 or more when a social media index 96 values include a range of zero to 1000. However, the present invention is not limited to the exemplary embodiment and other embodiments can be used to practice the invention.

A desired person is located directly by name and/or by unique search words and/or search criteria created by the desired person searched in part with cascading searching and posted publically to search engines and social media sites. The search results are publically viewable. However, communication with the desired person is on a private system 20, 26 for which another person desiring to communicate with the desired person must provide login information to communicate.

"Cascading searching" includes accessing one or more search criteria and/or unique search words in the social media ecosystem 10 and triggering searching of another totally different set and/or a related set of search criteria and/or search terms that in turn triggers another totally different set of search criteria and/or search terms, etc. However, the present invention is not limited to this exemplary embodiment and other embodiments and other types of searching methods can be used to practice the invention.

In the example above, a search for brown MIKI dogs may cascade to brown JIMMY CHO shoes, a search for Wednesday mornings may cascade to coffee and find Ms. Katherine A, etc.

Social Media Ecosystem Searching

Figure 8A:
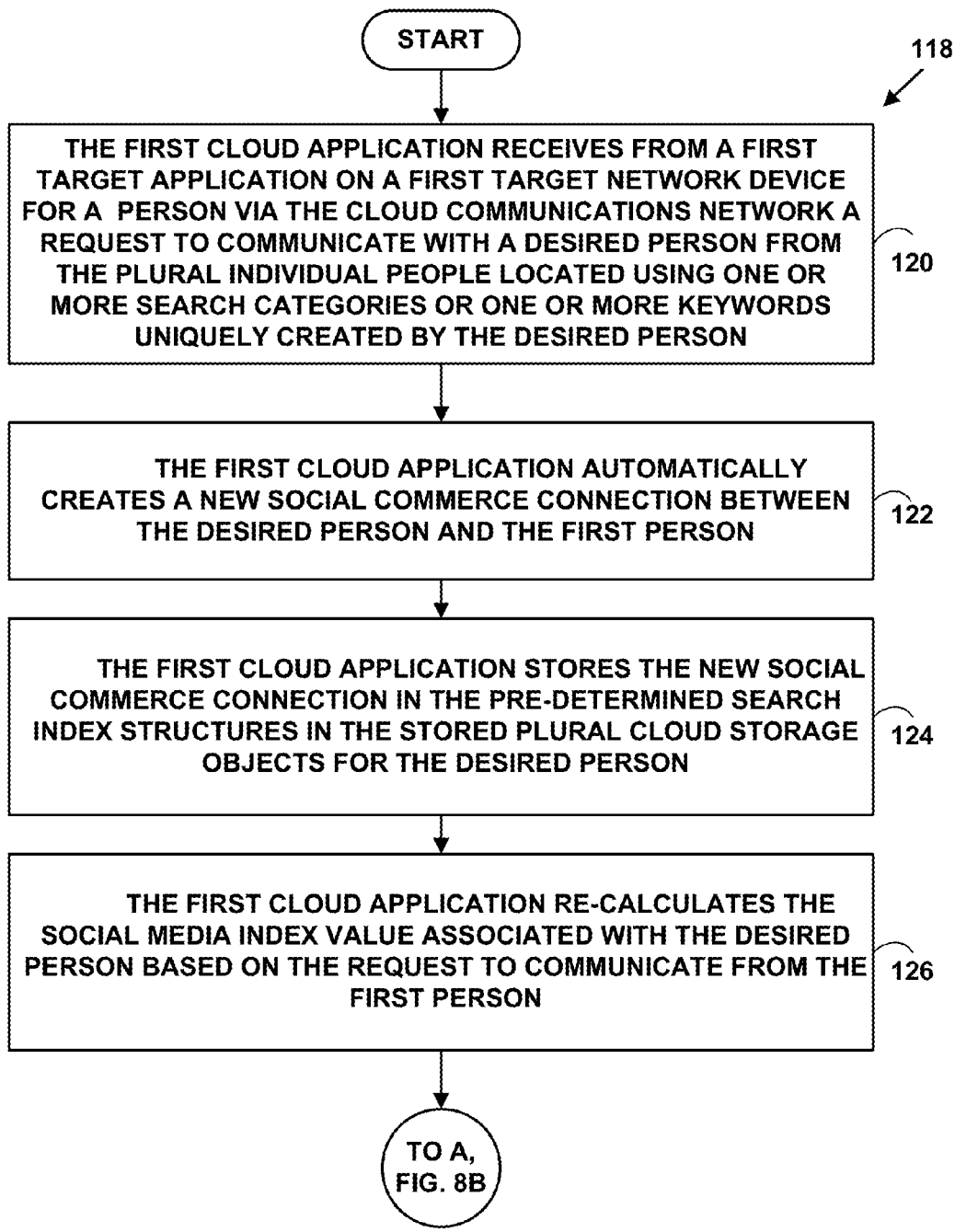
FIGS. 8A and 8B are a flow diagram illustrating a method for social media ecosystem searching.
Figure 8B:
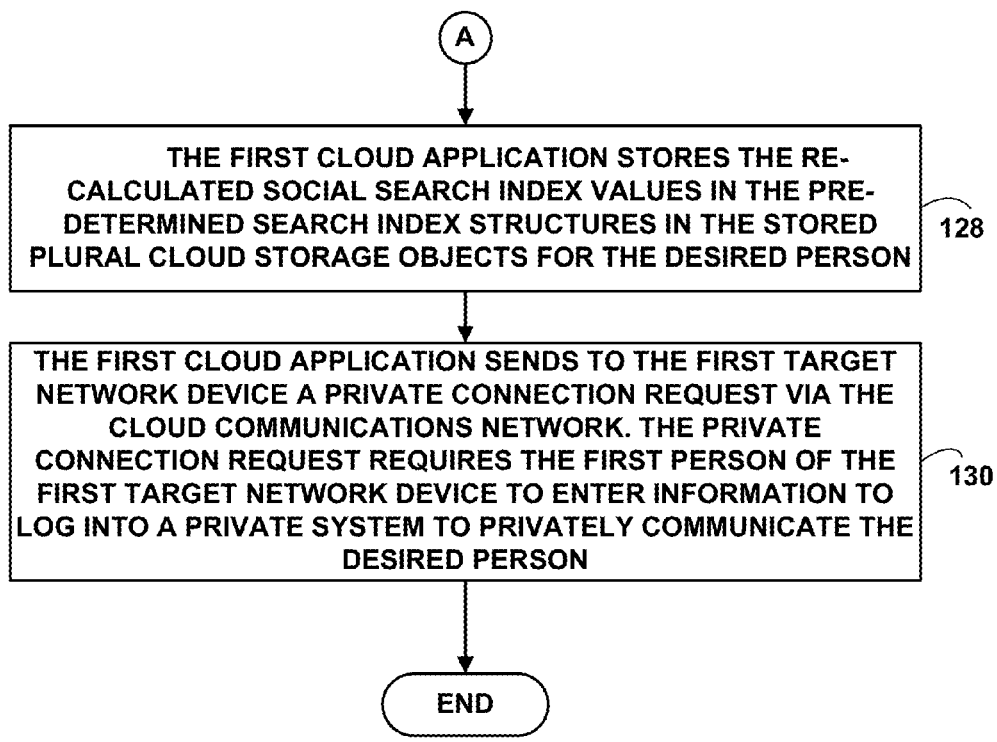

FIGS. 8A and 8B are a flow diagram illustrating a Method 118 for social media ecosystem searching. In FIG. 8A at Step 120, the first cloud application receives from a first target application on a first target network device for a person via the cloud communications network a request to communicate with a desired person from the plural individual people located using one or more search categories or one or more keywords uniquely created by the desired person. At Step 122, the first cloud application automatically creates a new social commerce connection between the desired person and the first user. At Step 124, the first cloud application stores the new social commerce connection in the pre-determined search index structures in the stored plural cloud storage objects for the desired person. At Step 126, the first cloud application re-calculates the social media index value associated with the desired person based on the request to communicate from the first user. In FIG. 8B at Step 128, the first cloud application stores the re-calculated social search index values in the pre-determined search index structures in the stored plural cloud storage objects for the desired person. At Step 130, the first cloud application sends to the first target network device a private connection request via the cloud communications network. The private connection request requires the first user of the first target network device to enter information to log into a private system to communicate the desired person.

Method 118 is illustrated with an exemplary embodiment. However, the present invention is not limited to the exemplary embodiment and other embodiments can be used to practice the invention.

In such an exemplary embodiment in FIG. 8A at Step 120, the first cloud application 30' receives from a first target application 30 on a first target network device 12 from a first user via the cloud communications network 18 a request to communicate with a desired person from the plural individual people located using one or more search categories or one or more keywords uniquely created by the first user.

At Step 122, the first cloud application 30' automatically creates a new social commerce connection 107 between the desired person and the first user sending the connection request from the first target network device 12. In one embodiment, the new social commerce connection 107 includes a social connection. In another embodiment, the new social commerce connection 107 includes a social linking connection and an e-commerce connection. In another embodiment, the new social commerce connection 107 includes other types of social commerce connections 107. However, the present invention is not limited to such connection and more, fewer or other social commerce connections 107 can be used to practice the invention.

In another embodiment, at Step 122, the user of the first target network device 12 manually creates new social commerce connections 107 with application 30 on the first target network device 12. However, the present invention is not limited to such connection and more, fewer or other social commerce connections 107 can be used to practice the invention.

At Step 124, the first cloud application stores the new social commerce connection 107 in the pre-determined search index structures 88 in the stored plural cloud storage objects 82 for the desired person.

In FIG. 8B at Step 126, the first cloud application 30' re-calculates the social media index value 96 associated with the desired person based on the request to communicate from the first user.

At Step 128, the first cloud application 30' stores the re-calculated social search index value 96 in the pre-determined search index structures 88 in the stored plural cloud storage objects 82 for the desired person.

At Step 130, the first cloud application 30' sends to the first target network device 12 a private connection request via the cloud communications network 18. The private connection request requires the first user of the first target network device 18 to enter information to log into a private system 20, 26 to communicate with the desired person.

Social Media Ecosystem Searching with a Social Media Index

Figure 9B:
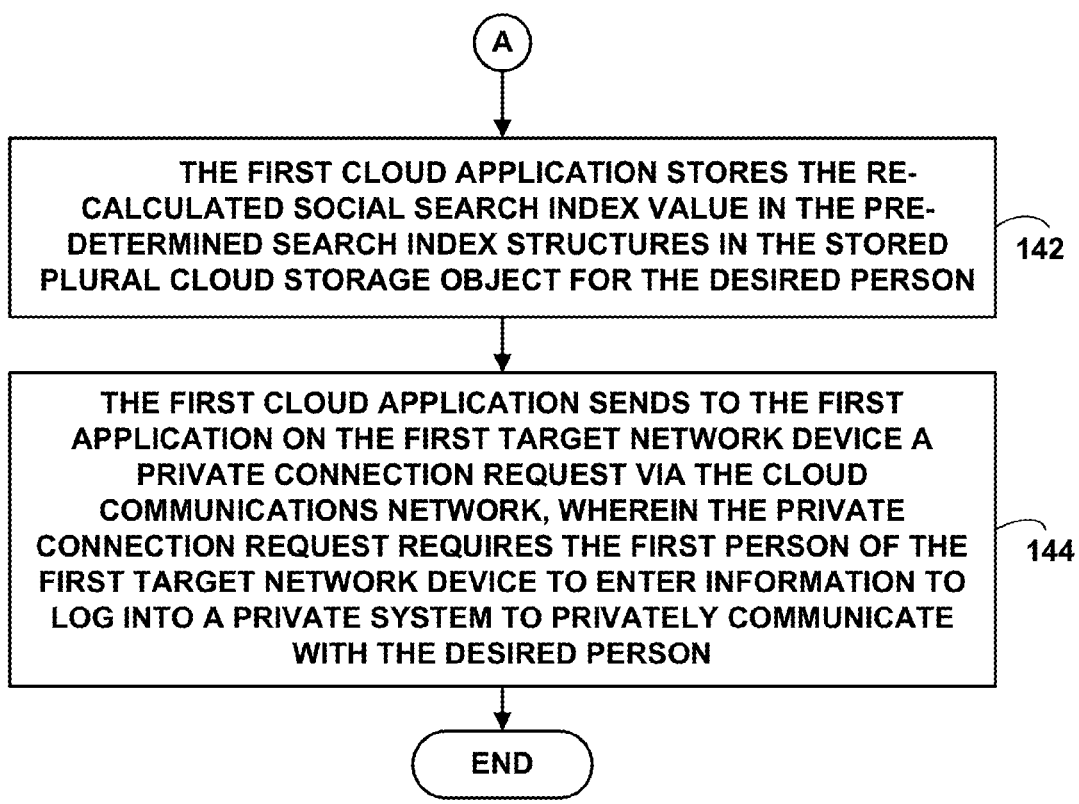

FIGS. 9A and 9B are a flow diagram illustrating a Method 132 for social media ecosystem searching. In FIG. 9A at Step 134, the first cloud application receives from a first target application on first target network device for a first user via the cloud communications network a request to communicate with a desired person from the plural individual people located using a social media index value. At Step 136, the first cloud application automatically creates a new social commerce connection between the desired person and the first user sending the connection request from the first target network device. At Step 138, the first cloud application automatically stores the new social commerce connection in the pre-determined search index structures in the stored plural cloud storage objects for the desired person. At Step 140, the first cloud application re-calculates the social media index value associated with the desired person based on the request to communicate from the first user. In FIG. 9B at Step 142, the first cloud application stores the re-calculated social search index value in the pre-determined search index structures in the stored plural cloud storage object for the desired person. At Step 144, the first cloud application sends to the first application on the first target network device a private connection request via the cloud communications network. The private connection request requires the first user of the first target network device to enter information to log into a private system to privately communicate with the desired person.

Method 132 is illustrated with an exemplary embodiment. However, the present invention is not limited to the exemplary embodiment and other embodiments can be used to practice the invention.

In such an exemplary embodiment in FIG. 9A at Step 134, the first cloud application 30' receives from a first target application 30 on a first target network device 12 via the cloud communications network 18 a request to communicate with a desired person from a first user located using a social media index value 96.

At Step 136, the first cloud application 30' automatically creates a new social commerce connection 107 between the desired person and the first user sending the connection request from the first target network device 12.

In another embodiment, at Step 136, the user of the first target network device 12 manually creates new social commerce connections 107 with application 30 on the first target network device 12. However, the present invention is not limited to such connection and more, fewer or other social commerce connections 107 can be used to practice the invention.

At Step 138, the first cloud application 30' automatically stores the new social commerce connection 107 in the pre-determined search index structures 88 in the stored plural cloud storage objects 92 for the desired person.

At Step 140, the first cloud application 30' re-calculates the social media index value 96 associated with the desired person based on the request to communicate.

In FIG. 9B at Step 142, the first cloud application 30' stores the re-calculated social search index value 96 in the pre-determined search index structures in the stored plural cloud storage object 82 for the desired person.

At Step 144, the first cloud application 30' sends to the first target application on the first target network device 12 a private connection request via the cloud communications network 18. The private connection request requires first user of the first target network device 12 to enter information to log into a private system 20, 26 to privately communicate with the desired person.

Social Media Ecosystem Searching for an Advertiser

Figure 10B:
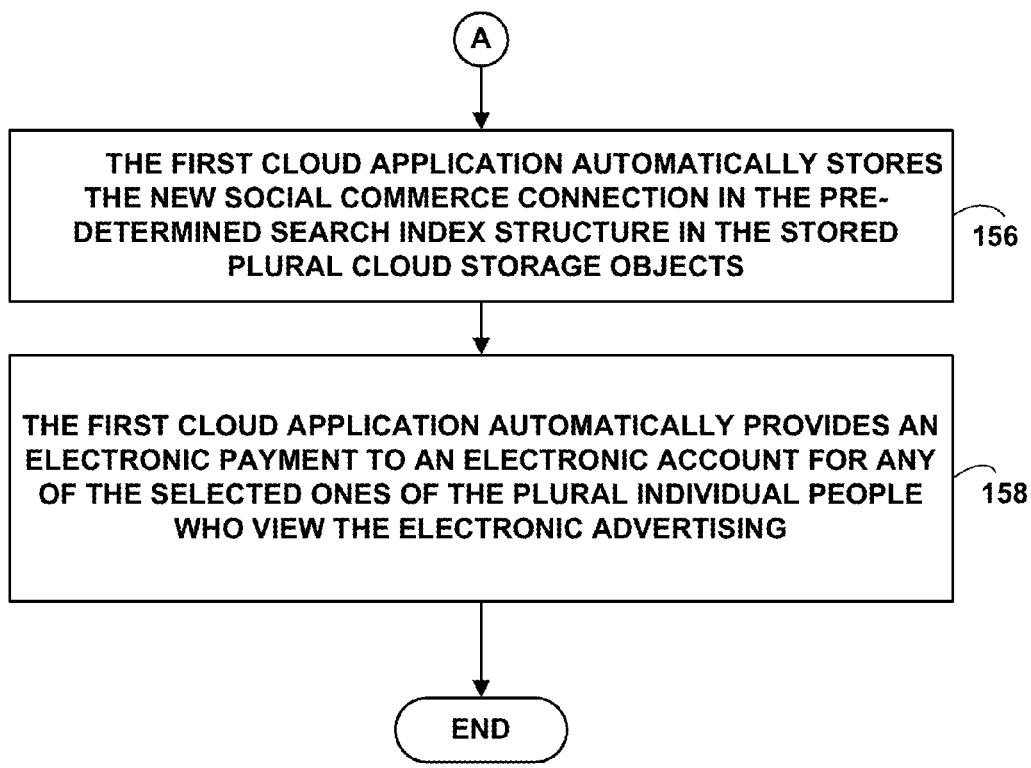

FIGS. 10A and 10B are a flow diagram illustrating a Method 146 for social media ecosystem searching. In FIG. 10A at Step 148, the first cloud application receives a request from an advertiser on another network device with one or more processors to provide electronic advertising to selected ones of the plural individual people included in the plural pre-determined search index structures stored in the plural cloud storage objects based on a desired social media index value and/or unique keyword or search category and/or social commerce connection. At Step 150, the first cloud application provides electronic advertising to selected ones of the plural individual people included in the plural pre-determined search index structures stored in the plural cloud storage objects based on a desired social media index value and/or unique keyword or search category and/or social commerce connection. At Step 152, the first cloud application receives one or more electronic indications from one or more selected ones of the individual people who view the electronic advertising for the advertiser. At Step 154, the first cloud application automatically creates a new social commerce connection between any of the ones of the plural individual people who view the electronic advertising and the advertiser. In FIG. 10B at Step 156, the first cloud application automatically stores the new social commerce connection in the pre-determined search index structure in the stored plural cloud storage objects. At Step 158, the first cloud application automatically provides an electronic payment to an electronic account for any of the selected ones of the plural individual people who view the electronic advertising.

Method 146 is illustrated with an exemplary embodiment. However, the present invention is not limited to the exemplary embodiment and other embodiments can be used to practice the invention.

In such an exemplary embodiment in FIG. 10A at Step 148, Step 148, the first cloud application 30' receives a request from an advertiser on another network device 26 to provide electronic advertising to selected ones of the plural individual people included in the plural pre-determined search index structures 88 stored in the plural cloud storage objects 82 based on a desired social media index value 96 and/or unique keyword or search category and/or social commerce connection 107.

At Step 150, the first cloud application provides electronic advertising to selected ones of the plural individual people included in the plural pre-determined search index structures 88 stored in the plural cloud storage objects 82 based on desired social media index value 96 and/or unique keyword or search category and/or social commerce connection 107.

At Step 152, the first cloud application 30' receives one or more electronic indications from target devices 12, 14, 16 of one or more selected ones of the individual people who view the electronic advertising for the advertiser.

In FIG. 10B at Step 154, the first cloud application 30' automatically creates a new social commerce connection 107 between any of the ones of the plural individual people who view the electronic advertising and the advertiser.

At Step 156, the first cloud application 30' automatically stores the new social commerce connection 107 in the pre-determined search index structures 88 in the stored plural cloud storage objects 92.

At Step 158, the first cloud application 30' automatically provides an electronic payment to an electronic account for any of the selected ones of the plural individual people who view the electronic advertising.

Social Media Ecosystem Searching with a Social Commerce Connection

FIG. 11 is flow diagram illustrating a Method 160 for social media ecosystem searching. In FIG. 11 at Step 162, the first cloud application receives from a first target application on first target network device for a first user via the cloud communications network a request to communicate with a desired person from the plural individual people located using a social commerce connection. At Step 164, the first cloud application re-calculates the social media index value associated with the desired person based on the request to communicate from the first user. At Step 166, the first cloud application stores the re-calculated social search index value in the pre-determined search index structures in the stored plural cloud storage object for the desired person. At Step 168, the first cloud application sends to the first application on the first target network device a private connection request via the cloud communications network. The private connection request requires the first user of the first target network device to enter information to log into a private system to privately communicate with the desired person.

Method 160 is illustrated with an exemplary embodiment. However, the present invention is not limited to the exemplary embodiment and other embodiments can be used to practice the invention.

In such an exemplary embodiment in FIG. 11 at Step 162, the first cloud application 30' receives from a first target application 30 on first target network device 12 for a first user via the cloud communications network 18 a request to communicate with a desired person from the plural individual people located using a social commerce connection 107.

At Step 164, the first cloud application 30' re-calculates the social media index value 96 associated with the desired person based on the request to communicate from the first user.

At Step 166, the first cloud application 30' stores the re-calculated social search index value 96 in the pre-determined search index structures 88 in the stored plural cloud storage object 82 for the desired person.

At Step 168, the first cloud application 30' sends to the first target application 30 on the first target network device 12 a private connection request via the cloud communications network 18. The private connection request requires the first user of the first target network device 12 to enter information to log into a private system 20, 26 to privately communicate with the desired person.

With methods 118, 132 160, a desired person is located using information publically to search engines and/or social media sites. However, communication with the desired person is on a private system for which another person desiring to communicate with the desired person must provide login information to communicate with the desired person. The private system helps ensure that social media index values and social commerce connections 107 are properly recorded and/or updated and/or established.

Presented herein is a method and system for social media ecosystem searching. A desired person can be searched for from public search engines and social media sites directly by name and/or by unique search keywords and search categories created and publically published by the desired person, a social media index of the desired person or a social commerce connection associated with the desired person. The search results are publically viewable. However, communication with the desired person located within the social media ecosystem is via a private system in which a searcher must provide login information to privately communicate with the desired person. The private system helps ensure that social media index values and social commerce connections are properly established, recorded and updated for the desired person and provides a layer of security and privacy. The social media searching ecosystem is provided on a cloud communications network for mobile and non-mobile devices.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for social media ecosystem searching, comprising:

receiving a plurality of electronic information from a plurality of target applications on a plurality of target network devices each with one or more processors on a first cloud application stored in a first non-transitory computer readable medium on a cloud server network device with the one or more processors via a cloud communications network for a social media ecosystem comprising: one or more public communication networks, one or more private networks, one or more community networks and one or more hybrid networks, wherein the plurality of electronic information includes a plurality of personal electronic information input into the plurality of target network devices by a plurality of individual people using search categories and search keywords uniquely created by the plurality of individual people, and creates a first level of privacy for the plurality of individual people for public searching based on the search categories and search keywords uniquely created by the plurality of individual people;

storing from the first cloud application the received plurality of electronic information for the plurality of individual people in a plurality of pre-determined search index structures in a plurality of cloud storage objects;

calculating from the first cloud application a plurality of social search index values for the plurality of pre-determined search index structures with the electronic information from the stored plurality of cloud storage objects and by calculating a plurality of numeric social media index values from a (X)dimensional entity of social commerce connections for each of the plurality of individual people with each dimension in the (X)dimensional entity assigned a pre-determined numeric percentage and with a smallest dimension(1) in the (X)dimensional entity assigned a largest numeric percentage and including a set of highest value social connections for an individual person and a largest dimension(X) in the (X)dimensional entity assigned a smallest numeric percentage and including a set of lowest value social connections for the individual person;

storing from the first cloud application the calculated social search index values and the calculated social media index values in the plurality of pre-determined search index structures in the stored plurality of cloud storage objects;

providing access from the first cloud application for the plurality of pre-determined search index structures stored in the plurality of cloud storage objects to a plurality of public search engines and to a plurality of social media sites via the cloud communications network the plurality of pre-determined search index structures stored in the plurality of cloud storage objects, wherein communication with a desired person being publically searched for is on a private system for which another person searching for and desiring to communicate with the desired person must provide login information on the private system to communicate with the desired person, providing a second level of privacy and a level of security for public search and private communication for the desired person by requiring the another person to provide login information on the private system to communicate with the desired person; and accepting public search requests for any of the plurality of individual people, wherein the public search requests allow any other person on the cloud communications network to publically search for and privately communicate with any of the plurality of individual people directly searching by name or searching by using the search categories and keywords uniquely created by the plurality of individual people or searching by social search index values calculated for the plurality of individual people, and providing the plurality of layers of privacy and the level of security for public searching and private communication for any of the plurality of individual people;

receiving on the first cloud application from a first target application on a first target network device via the cloud communications network a request to communicate with a desired person from the plurality of individual people located using one or more search categories or one or more keywords uniquely created by the desired person;

creating automatically from the first cloud application a new social commerce connection between the desired person and a first user sending the connection request from the first target network device;

storing from the first cloud application the new social commerce connection in a pre-determined search index structure in the stored cloud storage objects for the desired person;

re-calculating automatically from the first cloud application one or more social media index values and one or more social search index values associated with the desired person based on the request to communicate;

storing from the first cloud application the re-calculated one or more social search index values and the re-calculated social media index values in the pre-determined search index structure in the stored cloud storage objects for the desired person;

sending from the first cloud application to the first application on the first target network device a private connection request via the cloud communications network, wherein the private connection request requires the first user of the first target network device to enter login information to log into the private system to privately communicate with the desired person.

2. The method of claim 1 wherein the first target network device is a smartphone or a tablet computer and the first target application is a smart application for the smartphone or tablet computer.

3. The method of claim 1 further comprising:

receiving on the first cloud application from a first target application on a first target network device via the cloud communications network a request to communicate with a desired person from the plurality of individual people located using a social media index value;

creating automatically from the first cloud application a new social commerce connection between the desired person and a person sending the connection request from the first target network device;

storing from the first cloud application the new social commerce connection in a pre-determined search index structure in stored cloud storage objects for desired person;

re-calculating automatically from the first cloud application one or more social media index values and one or more social search index values associated with the desired person based on the request to communicate;

storing from the first cloud application the re-calculated one or more social media index values and the re-calculated social search index values in the pre-determined search index structure in the stored cloud storage objects for the desired person;

sending from the first cloud application to the first target application on the first target network device a private connection request via the cloud communications network, wherein the private connection request requires a user of the first target network device to enter information to log into a private system to privately communicate the desired person.

4. The method of claim 1 further comprising:

receiving on the first cloud application from a first target application on a first target network device via the cloud communications network a request to communicate with a desired person from the plurality of individual people located using a social commerce connection;

re-calculating automatically from the first cloud application one or more social media index values and one or more social search index values associated with the desired person based on the request to communicate;

storing from the first cloud application the re-calculated one or more social search index values and the re-calculated social media index values in the pre-determined search index structure in the stored cloud storage objects for the desired person; and sending from the first cloud application to the first target application on the first target network device a private connection request via the cloud communications network, wherein the private connection request requires a user of the first target network device to enter information to log into a private system to privately communicate with the desired person.

5. The method of claim 4 wherein the social commerce connection includes a social linking connection and an e-commerce connection.

6. The method of claim 1 further comprising:

receiving on the first cloud application from an advertiser on another network device with one or more processors a request to provide electronic advertising to selected ones of the plurality of individual people included in the plurality of pre-determined search index structures stored in the plurality of cloud storage objects based on a desired social media index value or unique search keywords or search criteria created by plurality of individual people or social commerce connection;

providing from the first cloud application electronic advertising to selected ones of the target network devices of the plurality of individual people included in the plurality of pre-determined search index structures stored in the plurality of cloud storage objects based on the desired social media index value or unique search keywords or search criteria created by plurality of individual people or social commerce connection;

receiving on the first cloud application one or more electronic indications from one or more selected ones of the target network devices of the individual people who view the electronic advertising for the advertiser;

creating automatically from the first cloud application a new social commerce connection between any of the ones of the plurality of individual people who view the electronic advertising and the advertiser; and providing from the first cloud application an electronic payment to an electronic account on the first cloud server network device for any of the selected ones of the plurality of individual people who view the electronic advertising.

7. The method of claim 1 wherein the step of storing from the first cloud application the received plurality of electronic information for the plurality of individual people in a plurality of pre-determined search index structures in a plurality of cloud storage objects includes:

translating automatically from the first cloud application the received plurality of information into a plurality of different supported languages; and storing from the first cloud application the translated plurality of information in the plurality of cloud storage objects, wherein the translated plurality of information is available globally for searching in the plurality of supported languages from anywhere on the cloud communications network.

8. The method of claim 1 wherein the social media ecosystem includes a community of participates and searchers in conjunction with technology components of a cloud communications environment comprising server network devices, gateways, routers, switches, wired interfaces, wireless interfaces and target network devices interacting and cooperating as a social media ecosystem.

9. The method of claim 1 wherein the plurality of social media index values are calculated with at least a four-dimensional (4D) or four deep social media index entity.

10. The method of claim 1 wherein a desired person is located using unique search words or search criteria created by the desired person and with cascading searching and posted publically for review to public search engines and social media sites and wherein communication with the desired person is on a private system for which another person desiring to privately communicate with the desired person must provide login information to communicate, thereby ensuring a social media index value and social commerce connections for the desired person are properly updated and established.

11. The method of claim 1 wherein the cloud storage object includes Representational state transfer (REST), Simple Object Access Protocol (SOAP), or Lightweight Directory Access Protocol (LDAP) cloud storage objects.

12. The method of claim 1 wherein the target network devices include smartphones and tablet computers.

13. The method of claim 12 wherein the target network devices include a smart application for social media ecosystem searching.

14. The method of claim 1 the cloud server network device and the plurality of target network devices include a wireless networking interface comprising: a Wireless Personal Area Network (WPAN), Radio Frequency (RF), IEEE 802.11a, 802.11b, 802.11g, 802.11n, 802.15.4 (ZigBee), 802.16a, 802.16g, Wireless Fidelity (WiFi), High Performance Radio Metropolitan Area Network (HIPERMAN) RF Home, Bluetooth, Infrared (IrDA), Radio Frequency Identifier (RFID), Internet Protocol (IP), Voice over IP (VoIP), Short Message Service (SMS) or Instant Message (IM), Worldwide Interoperability for Microwave Access (WiMax) with $4^{th}$ generation (4G) or faster wireless speeds, a Near Field Communications (NFC), or a Machine-to-Machine (M2M) wireless networking interface for communicating with the cloud communications network.

15. The method of claim 1 wherein the step of providing access from the first cloud application to the plurality of public search engines and to the plurality of social media sites via the cloud communications network, includes providing access to a plurality of public search engines including general search engines and vertical search engine services and the plurality of social media sites include a plurality of social networking sites, social couponing sites and social dating web-sites and the cloud communications network further includes cable television networks (CATV), satellite television networks (SATV), three-dimensional television (3DTV) networks, Internet television networks, Web-TV networks or Internet Protocol Television (IPtv) networks.

16. The method of claim 1 wherein the cloud communications network includes on-demand social media ecosystem search services, broadband network access, resource pooling, rapid elasticity and measured network services for social media ecosystem search services.

17. The method of claim 1 wherein the first cloud application offers a cloud computing Infrastructure as a Service (IaaS), a cloud Platform as a Service (PaaS) and offers a Specific cloud software service as a Service (SaaS) including a specific cloud software service for social media ecosystem searching.

18. A non-transitory computer readable medium having stored therein a plurality of instructions for causing one or more processors on one or more network devices for executing the steps of:

receiving a plurality of electronic information from a plurality of target applications on a plurality of target network devices each with one or more processors on a first cloud application stored in a first non-transitory computer readable medium on a cloud server network device with the one or more processors via a cloud communications network comprising: one or more public communication networks, one or more private networks, one or more community networks and one or more hybrid networks, wherein the plurality of electronic information includes a plurality of personal electronic information input into the plurality of target network devices by a plurality of individual people using search categories and search keywords uniquely created by the plurality of individual people, and creates a first level of privacy for the plurality of individual people for public searching based on the search categories and search keywords uniquely created by the plurality of individual people;

storing from the first cloud application the received plurality of electronic information for the plurality of individual people in a plurality of pre-determined search index structures in a plurality of cloud storage objects;

calculating from the first cloud application a plurality of social search index values for the plurality of pre-determined search index structures with the electronic information from the stored plurality of cloud storage objects and by calculating a plurality of numeric social media index values from a (X)dimensional entity of social commerce connections for each of the plurality of individual people with each dimension in the (X)dimensional entity assigned a pre-determined numeric percentage and with a smallest dimension(1) in the (X)dimensional entity assigned a largest numeric percentage and including a set of highest value social connections for an individual person and a largest dimension(X) in the (X)dimensional entity assigned a smallest numeric percentage and including a set of lowest value social connections for the individual person;

storing from the first cloud application the calculated social search index values and the calculated social media index values in the plurality of pre-determined search index structures in the stored plurality of cloud storage objects;

translating from the first cloud application the received plurality of information into a plurality of different supported languages;

storing from the first cloud application the translated plurality of information in the plurality of cloud storage objects, wherein the translated plurality of information is available globally for searching in the plurality of supported languages from anywhere on the cloud communications network;

providing access from the first cloud application for the plurality of pre-determined search index structures stored in the plurality of cloud storage objects to a plurality of public search engines and to a plurality of social media sites via the cloud communications network, wherein communication with a desired person being publically searched for is on a private system for which another person searching for and desiring to communicate with the desired person must provide login information on the private system to communicate with the desired person, providing a second level of privacy and a level of security for public search and private communication for the desired person by requiring the another person to provide login information on the private system to communicate with the desired person;
accepting public search requests for any of the plurality of individual people, wherein the public search requests allow any other person on the cloud communications network to publically search for and privately communicate with any of the plurality of individual people directly searching by name or searching by using the search categories and keywords uniquely created by the plurality of individual people or searching by social search index values calculated for the plurality of individual people, and providing the plurality of layers of privacy and the level of security for public searching and private communication for any of the plurality of individual people;
receiving on the first cloud application from a first target application on first target network device via the cloud communications network a request to communicate with a desired person from the plurality of individual people using one or more search categories or one or more keywords uniquely created by the desired person or a social media index value or a social commerce connection of the desired person;
creating automatically from the first cloud application a new social commerce connection between the desired person and a first user sending the connection request from the first target network device;
storing from the first cloud application the new social commerce connection in a pre-determined search index structure in the stored cloud storage objects for the desired person;
re-calculating from the first cloud application the social media index value associated with the desired person based on the request to communicate;
storing from the first cloud application the re-calculated social search index values in the pre-determined search index structure in the stored cloud storage objects for the desired person;
sending from the first cloud application to the first application on the first target network device a private connection request via the cloud communications network, wherein the private connection request requires a user of the first target network device to enter information to log into a private system to privately communicate with the desired person;
receiving on the first cloud application from an advertiser on another network device with one or more processors a request to provide electronic advertising to selected ones of the plurality of individual people included in the plurality of pre-determined search index structures stored in the plurality of cloud storage objects based on a desired social media index value or unique search keywords or search criteria created by plurality of individual people or social commerce connection;
providing from the first cloud application electronic advertising to selected ones of the target network devices of the plurality of individual people included in the plurality of pre-determined search index structures stored in the plurality of cloud storage objects based on the desired social media index value or unique search keywords or search criteria created by plurality of individual people or social commerce connection;
receiving on the first cloud application one or more electronic indications from one or more selected ones of the target network devices of the individual people who view the electronic advertising for the advertiser;
creating automatically from the first cloud application a new social commerce connection between any of the ones of the plurality of individual people who view the electronic advertising and the advertiser;
providing from the first cloud application an electronic payment to an electronic account on the first cloud server network device for any of the selected ones of the plurality of individual people who view the electronic advertising.

19. A system for social media ecosystem searching, comprising in combination:
a cloud communications network;
one or more network devices with one or more processors including a plurality of instructions configured:
for receiving a plurality electronic information from a plurality of target applications on a plurality of target network devices each with one or more processors on a first cloud application stored in a first non-transitory computer readable medium on a cloud server network device with the one or more processors via the cloud communications network comprising: one or more public communication networks, one or more private networks, one or more community networks and one or more hybrid networks,
wherein the plurality of electronic information includes a plurality of personal electronic information input into the plurality of target network devices by a plurality of individual people using search categories and search keywords uniquely created by the plurality of individual people, and creates a first level of privacy for the plurality of individual people for public searching based on the search categories and search keywords uniquely created by the plurality of individual people;
for storing from the first cloud application the received plurality of electronic information for the plurality of individual people in a plurality of pre-determined search index structures in a plurality of cloud storage objects;
for calculating from the first cloud application a plurality of social search index values for the plurality of pre-determined search index structures with the electronic information from the stored plurality of cloud storage objects and by calculating a plurality of numeric social media index values from a (X)dimensional entity of social commerce connections for each of the plurality of individual people with each dimension in the (X)dimensional entity assigned a pre-determined numeric percentage and with a smallest dimension(1) in the (X)dimensional entity assigned a largest numeric percentage and including a set of highest value social connections for an individual person and a largest dimension(X) in the (X)dimensional entity assigned a smallest numeric percentage and including a set of lowest value social connections for the individual person;
for storing from the first cloud application the calculated social search index values and the calculated social media index values in the plurality of pre-determined search index structures in the stored plurality of cloud storage objects;
for translating from the first cloud application the received plurality of information into a plurality of different supported languages;
for storing from the first cloud application the translated plurality of information in the plurality of cloud storage objects, wherein the translated plurality of information is available globally for searching in the plurality of supported languages from anywhere on the cloud communications network;

for providing access from the first cloud application for the plurality of pre-determined search index structures stored in the plurality of cloud storage objects to a plurality of public search engines and to a plurality of social media sites via the cloud communications network, wherein communication with a desired person being publically searched for is on a private system for which another person searching for and desiring to communicate with the desired person must provide login information on the private system to communicate with the desired person, providing a second level of privacy and a level of security for public search and private communication for the desired person by requiring the another person to provide login information on the private system to communicate with the desired person;

for accepting public search requests for any of the plurality of individual people, wherein the public search requests allow any other person on the cloud communications network to publically search for and privately communicate with any of the plurality of individual people directly searching by name or searching by using the search categories and keywords uniquely created by the plurality of individual people or searching by social search index values calculated for the plurality of individual people, and providing the plurality of layers of privacy and the level of security for public searching and private communication for any of the plurality of individual people;

for receiving on the first cloud application from a first target application on first target network device via the cloud communications network a request to communicate with a desired person from the plurality of individual people using one or more search categories or one or more keywords uniquely created by the desired person or a social media index value or a social commerce connection of the desired person;

for creating automatically from the first cloud application a new social commerce connection between the desired person and a first user sending the connection request from the first target network device;

for storing from the first cloud application the new social commerce connection in a pre-determined search index structure in the stored cloud storage objects for the desired person;

for re-calculating from the first cloud application the social media index value associated with the desired person based on the request to communicate;

for storing from the first cloud application the re-calculated social search index values in the pre-determined search index structure in the stored cloud storage objects for the desired person;

for sending from the first cloud application to the first application on the first target network device a private connection request via the cloud communications network, wherein the private connection request requires a user of the first target network device to enter information to log into a private system to privately communicate with the desired person;

for receiving on the first cloud application from an advertiser on another network device with one or more processors a request to provide electronic advertising to selected ones of the plurality of individual people included in the plurality of pre-determined search index structures stored in the plurality of cloud storage objects based on a desired social media index value or unique search keywords or search criteria created by plurality of individual people or social commerce connection;

for providing from the first cloud application electronic advertising to selected ones of the target network devices of the plurality of individual people included in the plurality of pre-determined search index structures stored in the plurality of cloud storage objects based on the desired social media index value or unique search keywords or search criteria created by plurality of individual people or social commerce connection;

for receiving on the first cloud application one or more electronic indications from one or more selected ones of the target network devices of the individual people who view the electronic advertising for the advertiser;

for creating automatically from the first cloud application a new social commerce connection between any of the ones of the plurality of individual people who view the electronic advertising and the advertiser;

for providing from the first cloud application an electronic payment to an electronic account on the first cloud server network device for any of the selected ones of the plurality of individual people who view the electronic advertising.

* * * * *